USOO5473143A

United States Patent [19]
Vak et al.

[11] Patent Number: 5,473,143
[45] Date of Patent: * Dec. 5, 1995

[54] ATM/POS BASED ELECTRONIC MAIL SYSTEM

[75] Inventors: Hugo Vak, New Port Richey, Fla.; William Stephens, Glendale, Calif.; Fred Zimmerman, Deephaven, Minn.

[73] Assignee: ATM Communications International, Inc., Wilmington, Del.

[ * ] Notice: The portion of the term of this patent subsequent to Nov. 23, 2010, has been disclaimed.

[21] Appl. No.: 131,327

[22] Filed: Oct. 4, 1993

Related U.S. Application Data

[63] Continuation-in-part of Ser. No. 764,449, Sep. 23, 1991, Pat. No. 5,265,033.
[51] Int. Cl.⁶ .................................................. G06K 5/00
[52] U.S. Cl. ........................ 235/380; 235/379; 235/375; 902/24
[58] Field of Search .................................. 235/375, 379, 235/380, 381, 454, 462, 493; 364/514; 902/2, 22, 24, 40

[56] References Cited

U.S. PATENT DOCUMENTS

| | | | |
|---|---|---|---|
| 3,956,615 | 5/1976 | Anderson | 902/2 |
| 4,315,101 | 2/1982 | Atalla | 902/2 |
| 4,321,672 | 3/1982 | Braun | 364/408 |
| 4,673,802 | 6/1987 | Ohmae | 235/379 |
| 4,902,881 | 2/1990 | Janku | 235/381 |
| 5,265,033 | 11/1993 | Vajk | 364/514 |

Primary Examiner—Donald Hajec
Assistant Examiner—Karl D. Frech
Attorney, Agent, or Firm—Niro, Scavone, Haller & Niro

[57] ABSTRACT

The technical field of the invention generally concerns electronic mail systems. The present invention provides an ATM or POS system having a terminal (22, 24, 26, 28 or 34) and processor (18 or 36) which are connected to an ATM or POS data communications network. The network also includes a store and forward message switch (52) which stores user messages for remote retrieval and use as an electronic mail system (10) on a data communications network (42). Messages can be stored or retrieved through standard ATM or POS terminals, through a service bureau, through touch tone telephones (84) or via modems (76). Messages can be retrieved remotely and sent to a facsimile machine (82), a remote paging device, computer (72) or the like. Message information may include payment of user bills, completion of user financial transactions and transmission of information from a variety of databases. Such message information may be generated and transmitted by the system at times predetermined by the user.

80 Claims, 10 Drawing Sheets

ATM/POS BASED ELECTRONIC MAIL SYSTEM

This is a continuation-in-part of application Ser. No. 07/764,449 filed on Sep. 23, 1991 now U.S. Pat. No. 5,265,033.

TECHNICAL FIELD

The present invention relates generally to computer data systems for storing and forwarding messages, including text and financial information, and, more particularly to an adaptation of existing worldwide Automated Teller Machine ("ATM") and Point of Sale ("POS") systems that permits users of such systems to receive and send electronic mail and other information.

BACKGROUND ART

Over the years, many different types of electronic message transmission devices have been developed. For transmitting spoken messages, one of the oldest, most widely used and convenient of these devices is the telephone. However, until quite recently, the telephone provided only live, real-time communication. Recently, "voice mail" services have become available that permit callers to leave spoken messages for later retrieval and reproduction to their intended recipients. While convenient, the cost of transmitting voice messages over the public or private phone system is relatively high in comparison with the cost of transmitting messages using surplus capacity that is available in communication systems that have been installed and are maintained in continuous operation for entirely different purposes.

Another recently developed message transmission technology is one with the ability to transmit text messages for later retrieval and reproduction by their intended recipient. Such systems are known as electronic mail and utilize an underlying technology known as a "Store And Forward Message Switch". However, most current electronic mail systems are both expensive and must be accessed using special purpose terminals. Presently, there exists no widely available means by which the public or private can conveniently and inexpensively access electronic mail communication.

Yet other recently developed communication systems are the many independently operated ATM systems and POS systems. One of the characteristics of the various ATM and POS systems is their interconnection by many clearing house or regional, national or international EFT networks. These clearing house networks pass transactions back and forth between terminals on one ATM or POS system and another ATM or POS system on which the user's account identification records reside.

It appears desirable to link parts of existing communication systems to provide readily accessible public or private electronic mail communication that frees users from the need to use a special purpose terminal. Such a combined system facilitates sending and receiving electronic mail and also provides much greater functionality to the existing voice and data communication systems.

DISCLOSURE OF INVENTION

An object of the present invention is to provide a convenient means by which the public can readily avail themselves of electronic mail services.

Another object of the present invention is to provide an economical system for public or private access to electronic mail services.

Another object of the present invention is to provide a secure system for public or private access to electronic mail services.

Yet another object of the present invention is to provide a highly reliable system for public or private access to electronic mail services.

Briefly, the present invention provides an electronic mail system by which users can easily authorize, generate and capture messages and responses. This includes new financial transactions based on data sent to the terminal user included within the message transactions sent to the terminal user to provide a method for payment of bills using electronic mail and/or other functions available on or through EFT networks. The system uses a debit card, a credit card or other machine readable personal identification card in conjunction with an authorized personal identification number ("PIN") or other valid password security identification to regulate access to the electronic mail service. The system of the present invention employs unique peripherals in conjunction with pans of existing communications networks and devices to provide simple text communications to remote locations. It provides this service by means of a structured link between a store and forward message switch and other already installed communication systems. The system of the present invention advantageously uses the existing networks of ATM and POS terminals together with the national or regional clearing house networks or communications processors that interconnect the various ATM and POS systems to provide wide public or private access to electronic mail services.

To access this electronic mail service, a user enters their debit, credit, or identification card into either an ATM or POS terminal. That terminal in conjunction with a local processor acquires the user's identity, the user's security information, and the user's desire to retrieve or enter messages. The local ATM or POS processor then passes this information through a processor for the ATM or POS institution to the information processor at the user's financial institution. It is also possible, based on the current state of the art of ATM and POS network systems, that the approval process may take place during an alternate account transaction processing step. This is described in more detail below. Upon receipt of this information, the processor for the user's financial institution confirms the user's identity and authorizes the user to access the electronic mail service. Such identification and authorization procedures are a routine operation on ATM and POS networks.

After a user's access to the electronic mail system has been approved by their financial institution, a clearing house processor for the ATM and/or POS networks permits the user to access its electronic mail message service control function. This message service control function differentiates among the various transactions (message or financial) involved in electronic mail communication that are in addition to the financial transactions normally exchanged over the ATM or POS network. The message service control function performed by the clearing house processor also tracks the status and steps required to complete electronic mail transmission.

The message service control function on the clearing house processor passes user entered electronic mail control information to a special purpose store and forward message switch for retrieving the user's messages and/or permitting the user to originate or transmit messages to other users. The store and forward message switch then returns messages and/or verification of status of messages for other users back through the message service control function of the clearing house processor for transmission back to the user at the ATM or POS terminal. The clearing house processor also separately passes accounting information to the user's financial institution for recording usage of the electronic mail services.

BRIEF DESCRIPTION OF DRAWINGS

Other features and advantages of the invention will become apparent from the following specification which, in association with the attached drawing figures and claims, describe the invention. The figures are annotated with consistent reference numerals throughout.

BEST MODE FOR CARRYING OUT THE INVENTION

Figure 1:
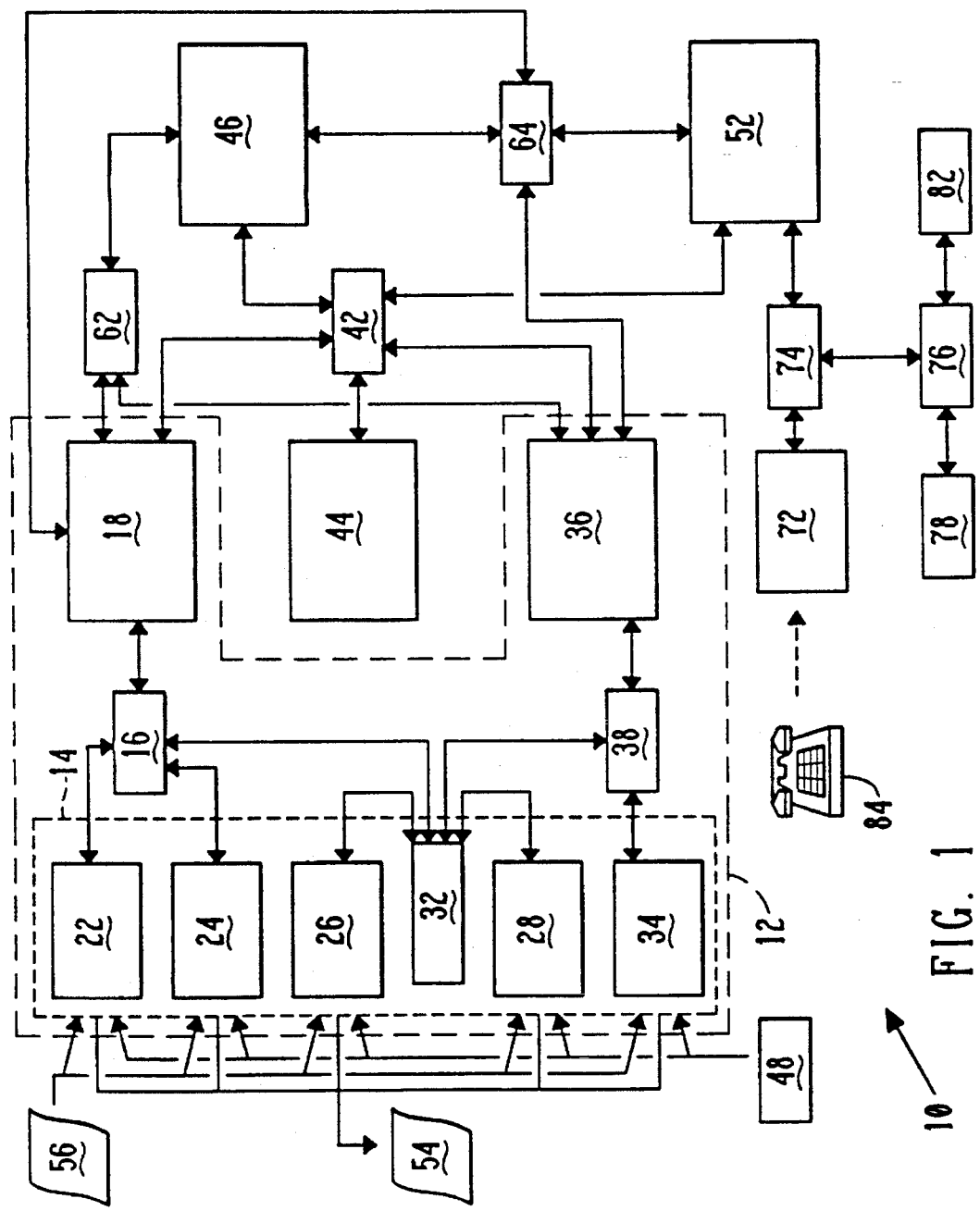
FIG. 1 is a block diagram depicting an entire system for providing an electronic mail service in accordance with the present invention including its ATM/POS subsystem, the ATM/POS institution processor, a user's financial institution processor, the clearing house processor, and the store and forward message switch.

FIG. 1 depicts a public or privately accessible electronic mail system in accordance with the present invention identified by the general reference character 10. The electronic mail system 10 illustrates a generic Automated Teller Machine or Point of Sale ("ATM/POS") system within the dashed line 12. The generic ATM/POS system 12 includes an ATM/POS subsystem enclosed within the dashed line 14, an ATM data communication network 16, and an ATM institution processor 18.

Figure 2:
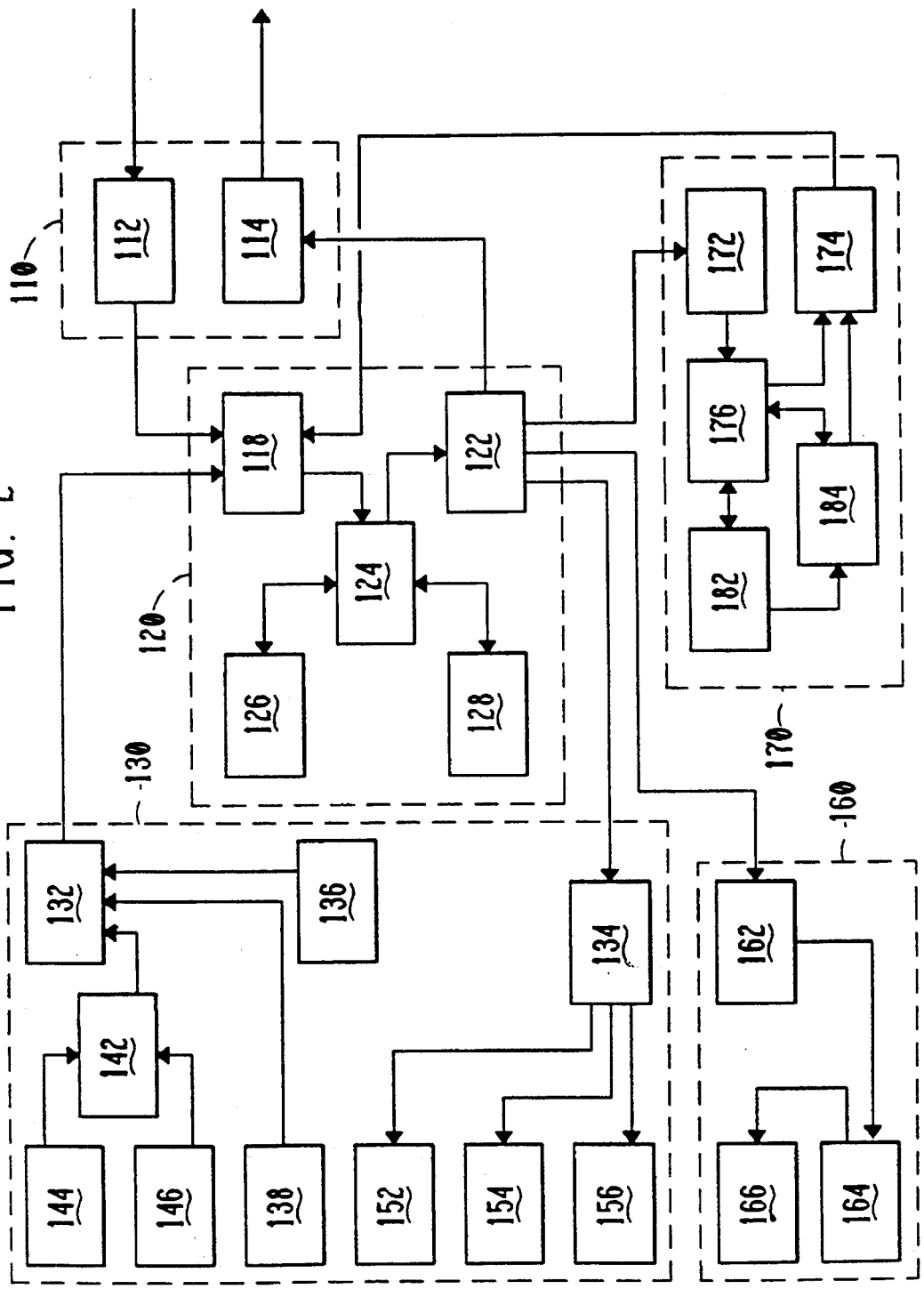
FIG. 2 is a block diagram depicting the functional elements included in a terminal of the ATM/POS subsystem illustrated in FIG. 1.

The ATM/POS subsystem 14 depicted in FIG. 1 illustrates different techniques routinely employed for connecting various types of ATM terminals 22 and 24 and ATM/POS terminals 26 and 28 to the ATM data communication network 16. In the ATM/POS subsystem 14 depicted in FIG. 1 each of the ATM terminals 22 and 24 include their own microprocessor as depicted in FIG. 2. Consequently, because the terminals 22 and 24 include their own microprocessor, each terminal 22 or 24 is individually capable of communicating directly with the ATM data communication network 16. Alternatively, ATM/POS terminals 26 and 28 illustrate a different technique in which the terminals 26 and 28 are connected to a shared processor 32 through which they communicate with the ATM data communication network 16. The ATM/POS subsystem 14 illustrated in FIG. 1 also depicts a POS terminal 34 that communicates with a POS institution processor 36 via a POS data communication network 38.

Because of the similarities among different ATM systems and POS systems when they are incorporated into the electronic mail system 10, for purposes of this disclosure it is possible to illustrate both of these different types of systems by means of a single generic ATM/POS system 12. If the generic ATM/POS system 12 of FIG. 1 were particularized to only an ATM system, then it would omit the POS terminal 34, the POS processor 36, and the POS data communication network 38, while the ATM/POS terminals 26 and 28 would communicate via the shared processor 32 only with the ATM data communication network 16. The ATM/POS system 12 enclosed within its dashed line, when so particularized to only an ATM system, allows a user to perform financial transactions with only the institution(s) whose records reside on the ATM institution processor 18.

Alternatively, if the generic ATM/POS system 12 of FIG. 1 were particularized to only a POS system, then it would omit the ATM terminals 22 and 24, the ATM data communication network 16, and the ATM institution processor 18, while the ATM/POS terminals 26 and 28 would communicate via the shared processor 32 only with the POS data communication network 38. The ATM/POS system 12 enclosed within its dashed line, when so particularized to an POS system, allows a user to make transactions with only the merchant(s) whose records reside on the POS institution processor 36.

In the illustration of FIG. 1, the shared processor 32 communicates only with the ATM data communication network 16 if the ATM/POS system 12 is particularized to an ATM system. Alternatively, if the ATM/POS system 12 is particularized to a POS system the shared processor 32 communicates only with the POS data communication network 38. The illustration in FIG. 1 of the shared processor 32 as being connected both to the ATM data communication network 16 and to the POS data communication network 38 presently does not exist in any known system. The shared processor 32 is so illustrated in the generic ATM/POS system 12 of FIG. 1 solely for pedagogical reasons to simplify FIG. 1 and to permit it to illustrate the characteristics common to both ATM and POS systems that are relevant to the present invention.

The electronic mail system 10 of the present invention envisions a plurality of independently operated ATM/POS systems 12 all intercommunicating simultaneously to provide the entire electronic mail service available to users. A clearing house data communication network 42 interconnects the plurality of ATM institution processors 18 and the plurality of POS institution processors 36 included in the electronic mail system 10 to a clearing house network processor 44. By transferring information among different ATM institution processors 18 operated by various financial institutions and among different POS institution processor 36 operated by various merchants, the clearing house data communication network 42 and the clearing house network processor 44 allow users to perform interinstitution transactions such as between one of the ATM/POS systems 12 and a processor 46 operated by a user's financial institution.

With the electronic mail system 10 as thus far described, a user begins to receive or transmit electronic mail using the ATM/POS system 12, the clearing house data communication network 42, the clearing house network processor 44, and the user's financial institution processor 46 by inserting a debit or credit card 48 into one of the terminals 22, 24, 26, 28 or 34 operated by one of the plurality of ATM/POS systems 12 included in the electronic mail system 10. Upon insertion of the card 48, the terminal 22, 24, 26, 28 or 36, in conjunction with the local microprocessor, acquires the user's identity and the user's security information. After the user enters a personal identification number ("PIN") or other security password or code, the terminal 22, 24, 26 28 or 34 communicates through its own ATM data communication network 16 and ATM institution processor 18 (or through its own POS data communication network 38 and POS institution processor 36), and the clearing house data communication network 42 with the clearing house network processor 44. The clearing house network processor 44 then interacts with the user's financial institution processor 46 through the clearing house data communication network 42 to access the user's account records, to obtain authorization for the user to access the electronic mail function of the electronic mail system 10, and to acquire appropriate information for charging such use to the user. As mentioned above, this approval process may take place during an alternate processing step and is described in fur\*her detail below. In authorizing usage of the electronic mail system 10, the user's financial institution processor 46 returns a message identification ("I.D.") for the user to the clearing house network processor 44.

Having received the user's message I.D. the clearing house network processor 44 then activates its message service control function to access, via the clearing house data communication network 42, information stored for the user on a store and forward message switch 52. Via the clearing house data communication network 42 and the ATM/POS system 12, the store and forward message switch 52 then sends a group of messages (one transaction) back to the terminal 22, 24, 26, 28 or 34 at which the user entered his request. After completing this transaction, the store and forward message switch 52 updates a status code for the messages delivered to indicate that they have been sent and are awaiting further instructions from the user as to final disposition.

By interacting with the terminal 22, 24, 26, 28 or 34 through a keyboard and/or function keys illustrated in FIG. 2, a user directs the ATM/POS subsystem 14 to display the retrieved messages on a display screen, also illustrated in FIG. 2. Using the keyboard and/or function keys of the terminal 22, 24, 26, 28 or 34, the user may request that the terminal 22, 24, 26, 28, or 34 print a copy of a retrieved message on paper 54.

The user may respond to or originate messages for storage on the store and forward message switch 52 using the terminal 22, 24, 26, 28 or 34 in the same manner as requesting access to stored messages. The electronic mail system 10 authorizes a user to respond to or originate messages in the same way as described above for retrieving messages. The user may aim originate various financial transactions using either visible or encoded data within the message received to authorize bill payment, stock purchase and/or other transactions made possible by having the information from other sources delivered to the terminal with the message. If the ATM/POS subsystem 14 possesses the ability to retain the user's identity and security code information, it is unnecessary for the user to reinsert the debit or credit card 48 and to reenter the security code. A response or a message to be stored on the store and forward message switch 52 may be entered at the terminal 22, 24, 26, 28 or 34 in a variety of different ways. For example, using an ATM/POS subsystem of the type depicted in FIG. 2, the user could respond to or enter a message using either a keyboard or a "pen pad." Alternatively, the terminal 22, 24, 26, 28 or 34 may include an optical character recognition unit (not illustrated in FIG. 2.) to scan a written message 56. A response or new message entered by the user at the terminal 22, 24, 26, 28 or 34 passes through the clearing house network processor 44 to the user's financial institution processor 46 which must authorize the response or message's storage on the store and forward message switch 52.

When the store and forward message switch 52 receives a response or a message, it validates the basics of the message, and if they are acceptable, stores the response or message for retransmission. Furthermore, the store and forward message switch 52 provides an acknowledgement to the terminal 22, 24, 26, 28 or 34 that the response or message has been stored. If the store and forward message switch 52 determines that a response or a message is unacceptable, in the same way it transmits a rejection message back to the terminal 22, 24, 26, 28 or 34 together with an explanation of the problem.

In addition to the preceding way in which various parts of the electronic mail system 10 of the present invention intercommunicate as described above, the present invention also envisions pathways, other than the clearing house data communication network 42 and the clearing house network processor 44, by which ATM/POS systems 12 may communicate with the user's financial institution processor 46 and the store and forward message switch 52. For example, if the electronic mail system 10 implements the message service control function somewhere other than on the clearing house network processor 44, then the ATM institution processor 18 or the POS institution processor 36 may obtain authorization and other information necessary for a user to access the electronic mail system 10 by communicating directly with the user's financial institution processor 46 via a user authorization data communication network 62. Under such circumstances, the ATM institution processor 18 or the POS institution processor 36 can also exchange user messages directly with the store and forward message switch 52 via a message data communication network 64. Properly implemented, any of the various data communication networks 42, 62 or 64 can provide the message transmission capability necessary for proper operation of the electronic mail system 10.

Generally, messages are presented to the store and forward message switch 52 from outside the ATM/POS system 12 by a computer terminal entry station 72. The station 72 may be any of several types of terminals that can communicate with electronic mail services. The station 72 could be a standard personal computer ("PC") with the message being created off-line and then transmitted to the store and forward message switch 52. Alternatively, the station 72 could be a terminal connected directly to a mainframe or mini-computer system.

The station 72 communicates with the store and forward message switch 52 via a hard wired or wireless message entry data communication network 74. In storing a message on the store and forward message switch 52, the station 72 identifies the user, either through a directory as normally provide by this type of service, or by knowing the user's electronic mail I.D. Directory services of this type are well known and are associated with many of the current electronic mail systems. A modem 76 using either a hard wired or wireless connection may also communicate with the message entry data communication network 74 to provide the electronic mail system 10 with a pager communication service 78 and a facsimile transmission machine 82.

The present invention also envisions other ways of storing messages on the store and forward message switch 52. For example, using a telephone 84 individuals without access to an E-Mail Service may call a service bureau that has a station 72 connected to the electronic mail system 10. Such a service bureau will be able to take messages from outside individuals by telephone and store them on the store and forward message switch 52. Similarly, the user can also send messages out to individuals who lack an I.D. on the electronic mail system 10 through a service bureau. Anyone with a phone or mailing address can, in principle, be reached by sending a message to the service bureau for forwarding to the individual with which the user wants to communicate. Such operations would be a normal part of the service bureau function to extend the reach of the message service to the general public or private.

Mother way of communicating with individuals who are not themselves users of the electronic mail system 10 is through the facsimile transmission machine 82. The store and forward message switch 52 recognizes when the user enters a facsimile telephone number as the destination address for a response or a message. Under such circumstances, the store and forward message switch 52 initiates a telephone call and uses the conventional facsimile transmission process to deliver the message to the intended recipient. After successful facsimile transmission of the message, the message's status is displayed to the user.

Furthermore, the electronic mail system 10 may announce to users that a message has been stored for them on the store and forward message switch 52. To announce the storage of a message, the store and forward message switch 52 places a telephone call to the pager communication service 78 thereby activating the user's beeper. Upon being notified of a message's storage, the user proceeds to a terminal 22, 24, 26, 28 or 34 for message retrieval.

The link created by the store and forward message switch 52 also allows connection to multiple external E-Mail systems through the industry standard X.400 or custom E-Mail to E-Mail links. Such E-Mail links have already been established by many of these services and are well known in the art. This allows easy physical connection to all of the existing E-Mail services, and provides handy communication to users of the electronic mail system 10 from outside the ATM/POS systems. Generally, all of the standard services provided by the E-Mail system will be the same, and will be available through the electronic mail system 10. However, due to the physical limitations which may practically be imposed on the electronic mail system 10, the scope of the message may be limited in some way. For example such limitations may include, but are not limited to, the size or the detail of the message, or similar limitations.

An additional feature of the electronic mail system 10 for individuals who themselves are not users of the system 10 is its ability to capture charge information instead of the normal E-Mail system charges that would be appropriate for those with E-Mail service access. This charge capture capability is a necessary part of providing easy service bureau access to the electronic mail system 10. This charge capture information includes charging bills and other payments authorized by the user in excess of the cost of the messages. Such other payments may include, but are not limited to, stock purchases, rent payments, utility payments, credit card payments and the like.

An additional function of the computer terminal entry station 72 is a connection port for additional data base information sources. Such information sources may direct data in digital form and in message format to a user's mailbox in the message switch 52. Such data may include, but is not limited to, weather message information, news message information, stock message information, commodities message information, brokerage message information and other message information on various general topics.

The Processor That Performs the Message Service Control Function

Figure 5:
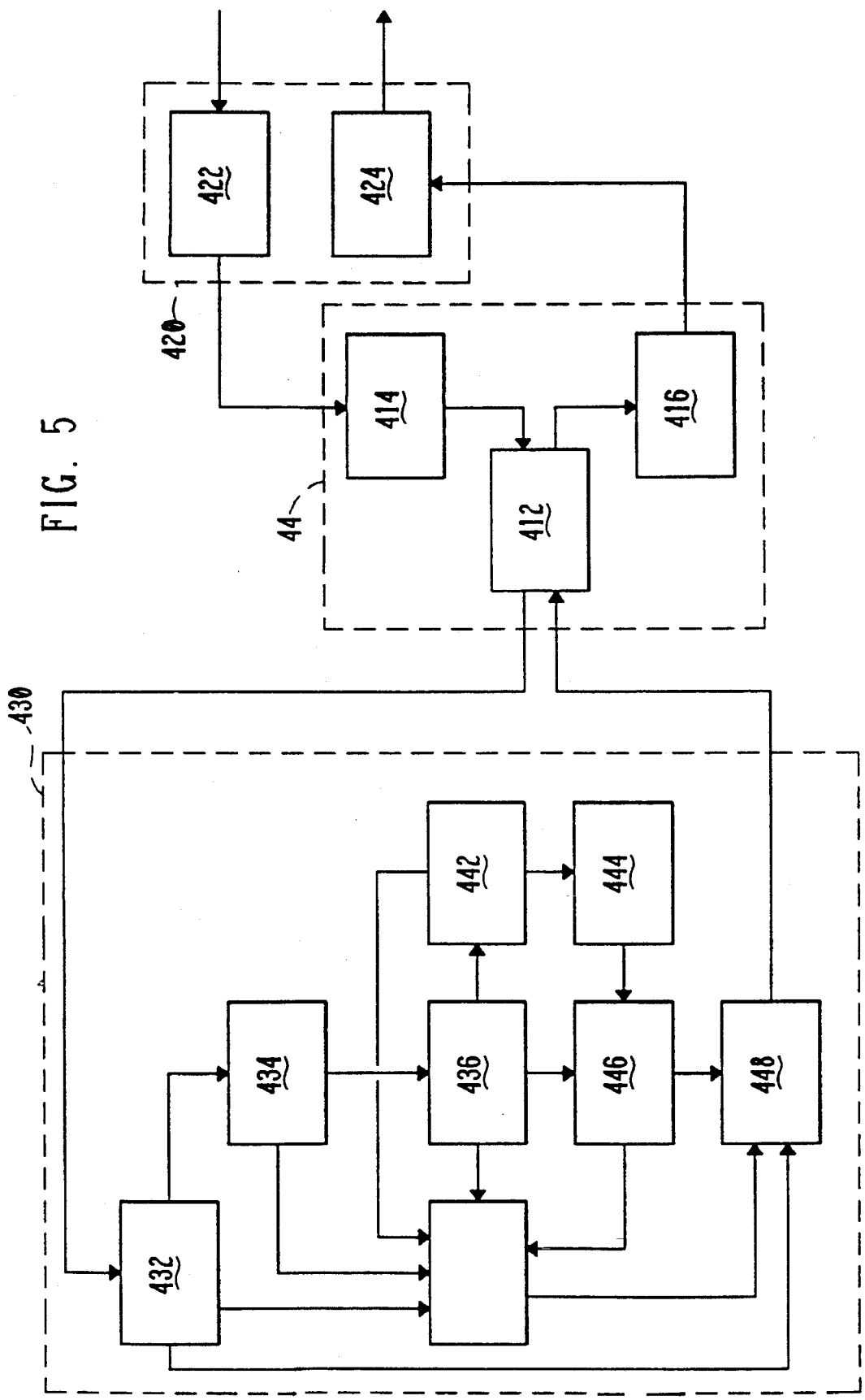
FIG. 5 is a combined block diagram and flow chart depicting the clearing house processor illustrated in FIG. 1 together with the functions performed by that processor in providing electronic mail services including the message service control function.

The message service control function, described in greater detail below in connection with FIG. 5, is an essential pan of the electronic mail system 10 of the present invention. As indicated above, it is not essential to the operation of the electronic mail system 10 that the message service control function be performed exclusively by the clearing house network processor 44. However, because the message service control function is an essential pan of the electronic mail system 10, details in the operations performed respectively on the processors 18, 36, 44 and 46 change slightly depending upon the particular processor that performs the message service control function.

The message service control function may be performed on the institution processor 18 or 36 included in the ATM/POS system 12 of the terminal 22, 24, 26, 28 or 34, or on institution processor 18 or 36 that belongs to another ATM/POS system 12, on the clearing house network processor 44, or on the user's financial institution processor 46 which itself may be an institution processor 18 or 36 that belongs to a different ATM/POS system 12 or on a separate store and forward message switch processor 52. Initially accessing the message service control function differs if the user's account records are maintained on a processor 18, 36, or 46 other than that in the ATM/POS system 12 presently serving the user.

After a user has been authorized to use the electronic mail system 10, the message service control function handles all further control relationships with the appropriate terminal 22, 24, 26, 28 or 34 and the store and forward message switch 52. After a user finishes entering a request at the terminal 22, 24, 26, 28 or 34, the ATM/POS subsystem 14 transmits it to the processor 18, 36 or 44 that performs the message service control function to be formatted before it is further transmitted through the networks 42, 62 or 64. The message will be formatted by the processor 18, 36 or 44 in accordance with normal system requirements using the new transaction types and transaction formats unique to the electronic mail system 10. Information for providing the message service control function is encoded and included in the message to identify the terminal location, date, time and other information, and becomes an associated part of the message and its audit trail. This message service control information added to each message is used in carrying out the message service control function and in operation of the store and forward message switch 52.

The message service control function also processes responses to user requests, and returns the results to the institution processor 18 or 36 for the ATM/POS system 12 controlling the operation of the terminal 22, 24, 26, 28 or 34 serving the user.

Determining Location/Affiliation

Destination can be identified using the normal location/affiliation directory or, as an alternate, a new directory associated with the message transactions alone, whichever is most efficient for network functionality. Furthermore, an alternate location/affiliation approval process may take place on the ATM or POS network during another processing step. Such alternate approval processing is well known in the state of the art of ATM and POS networks and will be readily understood by one skilled in the art.

ATM/POS Subsystem 14

FIG. 2 depicts the functional elements required for one entire terminal 22, 24, 26, 28 or 34 of the ATM/POS subsystem 14 depicted in FIG. 1. As illustrated in FIG. 2, all transactions between the terminal 22, 24, 26, 28 or 34 of the ATM/POS subsystem 14 and the data communication network 16 or 38 pass through a communications controller 110. The communications controller 110 includes an input buffer 112 and an output buffer 114. Within the ATM/POS subsystem 14, the communications controller 110 provides data contained in transactions received from the data communication network 16 or 38 from its input buffer 112 to an input 118 of a microprocessor 120. Analogously, the output buffer 114 of the communications controller 110 receives data from an output 122 of the microprocessor 120 for transmission as a transaction over the data communication network 16 or 38.

In addition to the input 118 and the output 122, the microprocessor 120 includes a central processing unit ("CPU") 124 that fetches data from the input 118 of the microprocessor 120 and stores data to its output 122. The CPU 124 of the microprocessor 120 also fetches data from and stores data into a memory 126. The microprocessor 120 also includes an arithmetic logical unit ("ALU") 128 that operates upon data received from the CPU 124 and returns the results of such operations to the CPU 124.

A simple modification to the terminal program to use a control code or delimiter indicating a field is not printable allows the inclusion within messages of encoded information that can be used for security and/or validation purposes. Such a control code or delimiter may be used by the terminal to allow the user to initiate financial transactions based on information contained within a "received" message.

The ATM/POS subsystem 14 also includes an input/output console 130. The input/output console 130 includes an input buffer 132 that transmits data to the input 118 of the microprocessor 120, and an output buffer 134 that receives data from the output 122 of the microprocessor 120. Included in the input/output console 130 supplying data to the input buffer 132 are various input devices including a debit or credit card reader 136, function keys 138, and a character decoder 142 that receives data both from a keyboard 144 and from a pen pad 146. Other input devices (not illustrated) may be any device configured on ATM/POS subsystem 14 available to the user such as a CRT touch screen, voice activated or voice recognition input devices. The input/output console 130 also includes various output devices including a display screen 152, an instruction panel and screen 154, and a status panel 156 that all receive data from the output buffer 134. The status panel 156 may include a number of indicators to inform a user of the various states (or status) of a transaction being performed including problems or errors that are likely to arise. These can be problems encountered by (or status of) the terminal 22, 24, 26, 28 or 34, the microprocessor 120, or errors or status communicated to the ATM/POS subsystem 14 from the processor 18, 36, 44 or 46 or from the store and forward message switch 52. The instruction panel 154 and display screen 152 can be used interchangeably for displaying the same information. Other output devices (not illustrated) may be any device configured on ATM/POS subsystem 14 available to the user such as an audio response unit.

In addition to the various output devices included in the input/output console 130, the ATM/POS subsystem 14 includes a printer subsystem 160. The printer subsystem 160 includes an output buffer 162, that receives data from the output 122 of the microprocessor 120, a printer mechanism 164 that receives data from the output buffer 162. A printer ejector 166, also included in the printer subsystem 160, receives control signals from the printer mechanism 164.

The printer subsystem 160 allows messages retrieved for the user to be sent to the output buffer 162, printed on the paper 54 by the printer mechanism 164, and then provided to the user by expelling the paper 54 through the printer ejector 166. Alternatively the printer subsystem 160 can be used in the same way to print an audit trail of messages entered into the terminal 22, 24, 26, 28 or 34. Use of the printer subsystem 160 can be very valuable where the messages, either entered or retrieved, are instructions to other individuals to take an action, or that require confirmation of an action.

In addition to the various input devices included in the input/output console 130, the ATM/POS subsystem 14 includes an optical character recognition ("OCR") subsystem 170. The OCR subsystem 170 includes an output buffer 172 that receives dam from the output 122 of the microprocessor 120 and an input buffer 174 that transmits data to the input 118 of the microprocessor 120. The OCR subsystem 170 includes a camera control function 176 that receives data from the output buffer 172 and transmits data to the input buffer 174. The camera control function 176 exchanges control and status signals with a document receiver 182 and a camera 184. The document receiver 182 supplies status signals to the camera 184. The camera 184 supplies data to the input buffer 174 of the OCR subsystem 170 for retransmission to the input 118 of the microprocessor 120.

The OCR subsystem 170 is used to capture pre-typed or hand written messages that are not already defined in the electronic mail system 10. To operate the OCR subsystem 170, coded instructions are stored in the output buffer 172 of the OCR subsystem 170. The camera control function 176 interprets the instructions and the document receiver 182 opens to accept the written message 56 from the user by utilizing a wand, fiat reader or other similar reading mechanisms. After acceptance, the camera 184 scans the message 56. If no errors are encountered, the scanned image will be placed in the input buffer 174 and further analysis and processing will occur according to the normal OCR processing capability of the terminal 22, 24, 26, 28 or 34 and the ATM/POS subsystem 14.

In addition, other input/output ("I/O") subsystems may be utilized with the ATM/POS subsystem 14. Such I/O subsystems include, but are not limited to, interactive video modules, personal communicators, wireless communication devices providing operator interaction with subsystem 14 and the like. These devices may be used to automatically activate certain control or information sources from the message switch 52. Such activation may be stored or otherwise encoded in the input media.

Figure 7:
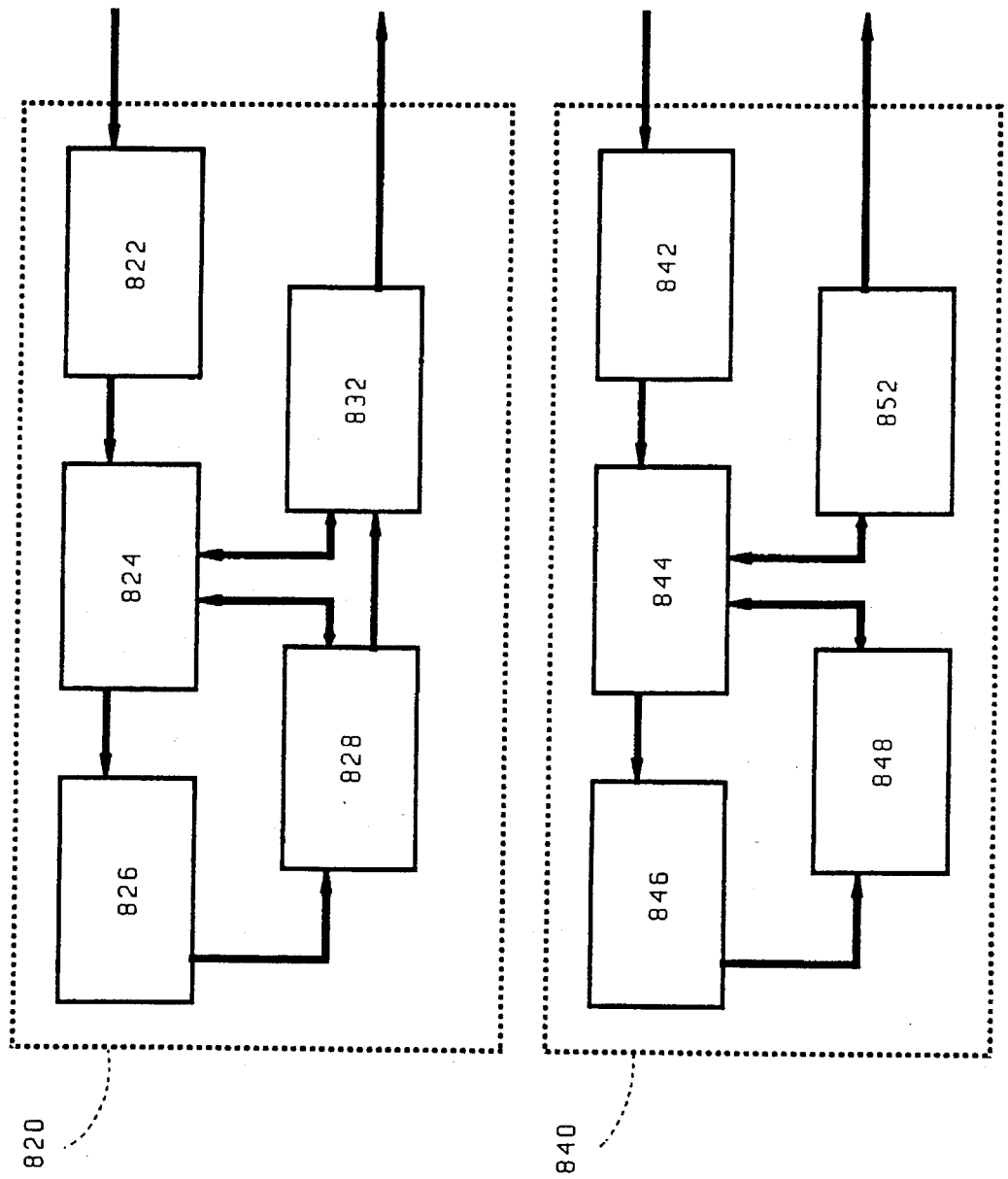
FIG. 7 is a combined block diagram and flow chart depicting magnetic ink character recognition ("MICR") subsystem and bar code reading subsystem input devices which may be used to input data into the ATM/POS subsystem.

The ATM/POS subsystem 14 may also include a magnetic ink character recognition ("MICR") subsystem 820, as illustrated in FIG. 7. The MICR subsystem 820 includes an output buffer 822 that receives data from the output 122 of the microprocessor 120 and an input buffer 832 that transmits data to the input 118 and of the microprocessor 120. The MICR subsystem 820 includes a magnetic ink reader control function common in banking check reading machinery 824 that receives data from the output buffer 822 and transmits data to the input buffer 832. The MICR sensing device 824 exchanges control and status signals with a document receiver 826 and an MICR Reader 828. The document receiver 826 supplies status signals to the reader 828. The reader 828 supplies data to the input buffer 832 of the MICR subsystem 820 for retransmission to the input 118 for the microprocessor 120.

The MICR subsystem 820 is used to capture pre-printed data that may be combined with other input messages from the console 130 such as bill payment information. To operate the MICR subsystem 820, coded instructions are stored in the output buffer 822 of the MICR subsystem 820. The MICR reader control function 824 interprets the instructions and the document receiver 826 opens to accept the printed material 56 from the user. After acceptance, the reader 828 scans the printed data from the material 56. If no errors are encountered, the scanned image will be placed in the input buffer 832 and further analysis and processing will occur according to the normal MICR processing capability of the terminal 22, 24, 26, 28 or 34 and the ATM/POS subsystem 14.

ATM/POS subsystem 14 may include a bar code reading subsystem 840, as illustrated in FIG. 7. The bar code subsystem 840 includes an output buffer 842 that receives data from the output 122 of the microprocessor 120 and an input buffer 852 that transmits data to the input 118 and of the microprocessor 120.

The bar code subsystem 820 includes a bar code reader control function common in commercial product recognition reading machinery 844 that receives data from the output buffer 842 and transmits data to the input buffer 852. The bar code sensing device 844 exchanges control and status signals with a document receiver 846 and a bar code reader 848. The document receiver 846 supplies status signals to the reader 848. The reader 848 supplies data to the input buffer 852 of the bar code reading subsystem 840 for retransmission to the input 118 of the microprocessor 120.

The bar code subsystem 840 is used to capture pre-printed bar code that may be combined with other input messages from the console 130 such as bill payment information. To operate the bar code reader subsystem 840, coded instructions are stored in the output buffer 842 of the bar code reader subsystem 840. The bar code reader control function 844 interprets the instructions and the document receiver 846 opens to accept the printed material 56 from the user. After acceptance, the reader 848 scans the printed data from the material 56. If no errors are encountered, the scanned image will be placed in the input buffer 852 and further analysis and processing will occur according to the normal bar coding processing capability of the terminal 22, 24, 26, 28 or 34 and the ATM/POS subsystem 14.

Figure 8:
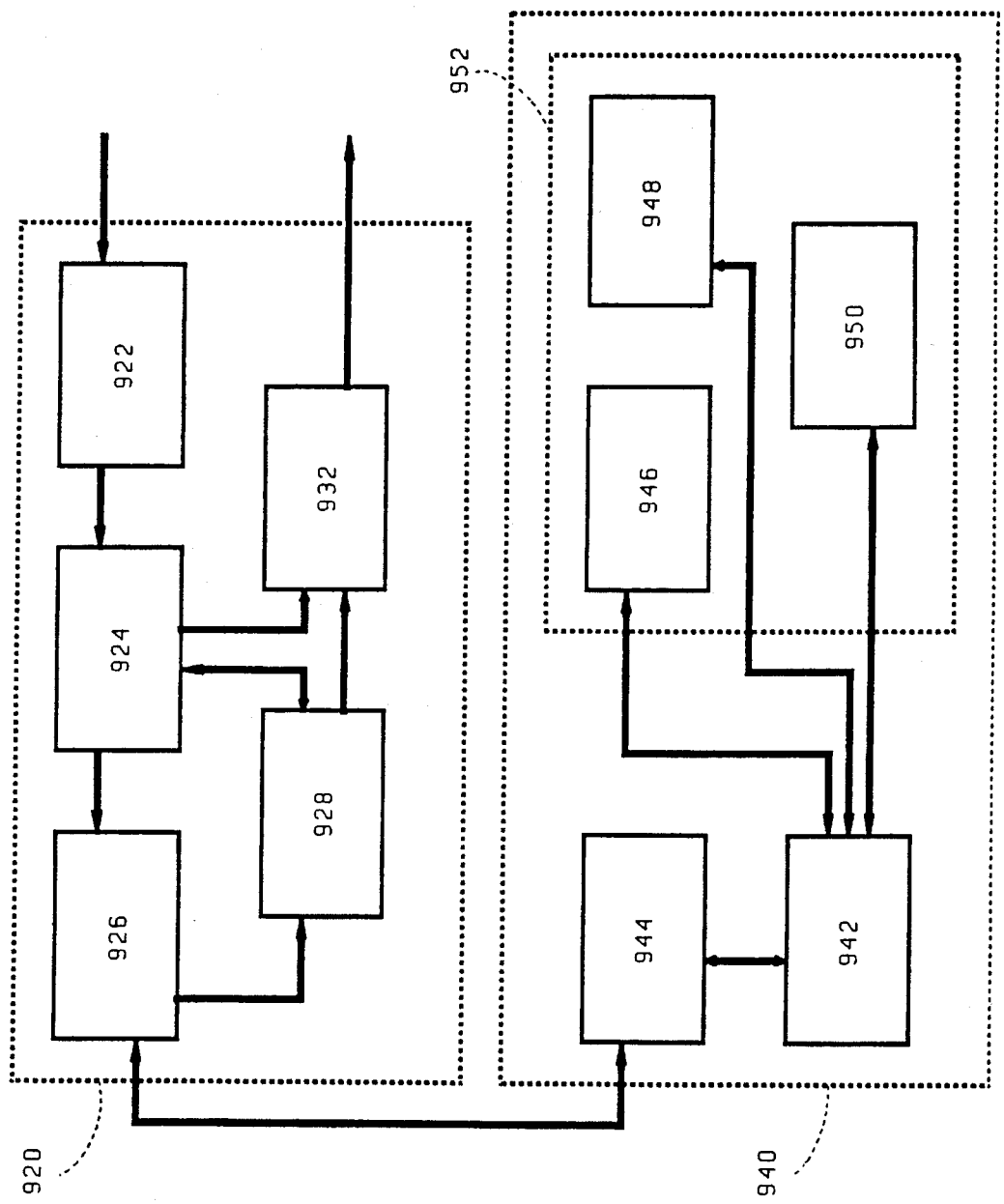
FIG. 8 is a combined block diagram and flow chart depicting an integrated circuit card reader/writer subsystem input device for inputting data into or receiving and storing data obtained from the ATM/POS subsystem.

An additional I/O subsection in the console 130 of ATM/POS 14 includes an integrated circuit ("I/C") card reader/writer subsystem 920, illustrated in FIG. 8. The I/C card subsystem 920 includes an output buffer 922 that receives data from the output 122 of the microprocessor 120 and an input buffer 932 that transmits data to the input 118 and of the microprocessor 120. The I/C card reader/writer subsystem 920 includes an I/C card reader/writer control function 924 that receives data from the output buffer 922 and transmits data to the input buffer 932. The I/C reader/writer control function 924 exchanges control and status signals with an I/C card acceptor 926 and an I/C reader/writer function 928. An external I/C plastic card 940 which contains an I/C card connector 944, a CPU 942 and a digital storage function 952 interfaces to the I/O subsection 920. The digital storage function 952 contains functions for storage of public key information, 948, private key information, 946 and message or other data 950. The I/C card subsystem 940 exchanges control signals and data from its storage 952 through the CPU 942 to the I/O subsection 920.

The I/C card 940 may be used to store clear text data, that is data not encrypted or otherwise encoded, or the I/C card may be used to transmit and receive encoded data for additional security when using the electronic mail system 10. Messages and other keyed or reader data entered through the console 130 or any subsystem connected to it may be sent to the 922. The controller 924 interprets the instructions and causes the data to be sent to the I/C card reader writer 928 and on the 940 through the I/C card acceptor 926. The data is received by the CPU 942 which then stores the data in storage location 950 and any keys received are stored in storage location 946 for private keys or location 948 for public keys. Using known public key cryptographic methods, the data may be encrypted in CPU 942 using the public key 948 of the intended recipient of the message. A signature may be included using the card-holder's private key 946 and a portion of the data in 950. The resultant encrypted message is then stored in location 950. The encrypted data so stored in location 950 can then be sent to CPU 942 through the I/C card connector 944 to the I/O subsystem 920 of the ATM/POS console 130 and on to subsystem 14 for ultimate transmission to the message switch 52.

The receiver of the message at an ATM/POS subsystem 14 equipped with subsystem 920 and holding an I/C card 940 may receive the previously described encrypted message through subsystem 920 and to final storage in I/C card storage 950. Upon command from subsystem 130, or a customer personal computer equipped with a subsystem compatible to subsystem 920, card subsystem 942 may process the message by taking the private key from memory storage 946 and decrypting the encrypted message that had been encrypted using a companion public key. The signature may be decrypted using the public key 948 of the person who sent the message. Using known cryptography the message could only be decrypted using the proper key, thus insuring secrecy and verification of the authenticity of the sender. The resultant clear text message may be viewed on ATM/POS subsystem 130 or on a personal computer via instructions to CPU 942 and the proper I/C card acceptor 926. Alternate adaptations of the use of subsystem 920 are also contemplated herein. Such uses include, but are not limited to, use of private key encryption methods such as DES.

While the various elements of the ATM/POS subsystem 14 are described above as though each of the terminals 22, 24, 26, 28 and 34 includes them all, depending upon precise details of the terminal 22, 24, 26, 28 or 34 some of the elements described above may, in fact, be shared among several terminals 22, 24, 26, 28 or 34. For examples, as depicted in FIG. 1, the ATM/POS terminals 26 and 28 are connected to the shared processor 32 through which they communicate with either one or the other of the data communication networks 16 or 38. Thus, the shared processor 32 includes both the communications controller 110 and the microprocessor 120 that are depicted in FIG. 2, and distributes their function to the input/output console 130, the printer subsystem 160, and the OCR subsystem 170 included in each of the ATM/POS terminals 26 and 28.

Institution Processor 18 or 36

Figure 3:
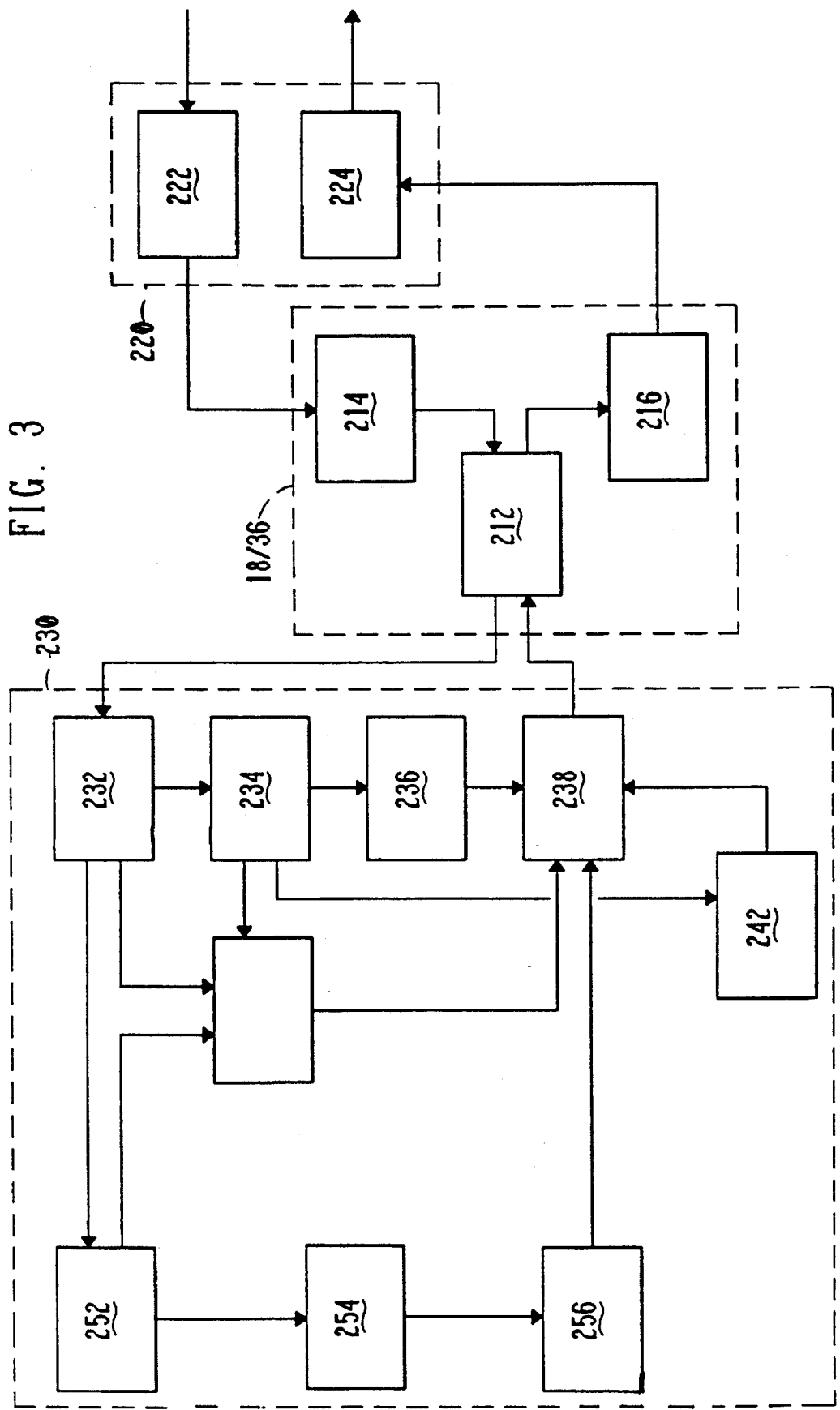
FIG. 3 is a combined block diagram and flow chart depicting the processor for the ATM or POS institution illustrated in FIG. 1 together with the functions performed by that processor in support of the electronic mail service, in particular the ATM or POS terminal management functions.

FIG. 3 is a combined block diagram and flow chart depicting the ATM or POS institution processor 18 or 36 of FIG. 1. The institution processor 18 or 36 includes a CPU 212 that includes a memory, similar to the memory 126 included in the microprocessor 120 of FIG. 2, and also an ALU, similar to the ALU 128 included in the microprocessor 120. The CPU 212 receives data from an input 214 included in the institution processor 18 or 36 and transmits data to an output 216 also included in the institution processor 18 or 36.

A communications controller 220 interfaces between the institution processor 18 or 36 and the data communication networks 16 or 38 and the clearing house data communication network 42. The communications controller 220 includes an input buffer 222 that receives transactions from the communication networks 16, 38 or 42 and transmits them to the input 214 of the institution processor 18 or 36. Similarly, the communications controller 220 includes an output buffer 224 that receives transactions from the output 216 of the institution processor 18 or 36 and transmits them to the communication networks 16, 38 or 42.

In FIG. 3, a dashed line box 230 encloses a flow chart of the computer program executed by the CPU 212 of the institution processor 18 or 36. The flow chart 230 sets forth the various functions performed by the institution processor 18 or 36 which are uniquely required for the operation of the electronic mail system 10. As depicted in the flow chart 230, the first operation performed for every message transaction processed by the institution processor 18 or 36 is a log transaction for recovery function 232. The log transaction for recovery function 232 is a standard function executed by the institution processor 18 or 36 of various different ATM/POS systems 12 in processing standard ATM or POS transactions. The only change needed in the log transaction for recovery functions 232 on existing ATM/POS systems 12 to accommodate the operation of the electronic mail system 10 is adding new record formats for message transactions to those already established for ATM or POS transactions.

If the message transaction received by the institution processor 18 or 36 is from a user at one of the terminals 22, 24, 26, 28 or 34 seeking initial access to the electronic mail system 10, the computer program performs a validate user function 234. The validate user function 234 is an existing capability included in all ATM/POS systems 12, though it is not always identified by a system or function name similar to that used here. This standard function remains essentially as it presently exists on the current ATM/POS systems 12, but new message oriented transaction types must be added to the present valid formats to support the electronic mail system 10. Part of this new logic may contain error handling and message validation checking functions for the mail subsystem 10. If the particular institution processor 18 or 36 that receives a user validation request from one of its terminal 22, 24, 26, 28 or 34 is able to verify the user's authority to access the electronic mail system 10 without communicating with the clearing house network processor 44, then the institution processor 18 or 36 performs a format external message request function 236.

The format external message request function 236 handles the special processing associated with message transactions that are unique to the electronic mail system 10. After the format external message request function 236 has been performed and the destination affiliation is identified, the transaction will be moved into the normal transaction processing by performing an insert message into output function 238. The insert message into output function 236 forwards the transaction to the appropriate destination which depends on where the message service control function processing occurs for this transaction. Specifically, the format external message request function 236 puts information in the proper format with the necessary structural parameters to allow continued processing by the ATM or POS network. This type of function is common in all state of the art ATM and POS networks.

If the particular institution processor 18 or 36 that receives a user validation request is unable to verify the user's authority to access the electronic mail system 10, then it performs a query other financial institutions function 242. The start of the process for accessing another institution through the query other financial institutions function 242 is essentially the same as for all existing or similar transactions processed by the ATM/POS system 12 when the institution processor 18 or 36 is not that of the user's financial institution. Determining location and affiliation of the particular user's account is performed using the standard location/ affiliation directory as described above.

From this point the transaction will be handled differently if the message service control function is provided by the clearing house network processor 44, or by the user's financial institution processor 46. Once the transaction is processed for local functions, and the destination affiliation is identified, the transaction moves into the standard insert message into output function 238 for transmission to the clearing house network processor 44. The insert message into output function 238 forwards the transaction to the appropriate destination, depending on where message service control function occurs for this transaction. The institution operating each ATM/POS system 12 may choose where it wishes to process message transactions for users being served by its terminals 22, 24, 26, 28 and 34 if alternative message service control functions exist.

The standard receive messages or timeout function 252 already performed by existing ATM/POS systems 12 need only be modified to handle all normal message transactions for the electronic mail system 10. After the transaction has been processed by the receive messages or timeout function 252, it then proceeds to a format messages for terminal function 254 that performs the formatting required for messages of the electronic mail system 10. The format messages for terminal function 254 uses information provided by the message service control function, the user's account profile, and the store and forward message switch 52 to format the message for presentation to the user at the specific terminal 22, 24, 26, 28 or 34 now serving the user.

The response as prepared by the format messages for terminal function 254 is then transferred to a transmit response to terminal function 256 that is a standard function already performed by the institution processor 18 or 36. The present transaction and data exchange protocol performed by the transmit response to terminal function 256 need be modified from that on existing ATM/POS systems 12 only to the extent necessary to process the message transaction formats unique to the electronic mail system 10. The transmit response to terminal function 256 transfers the formatted data to the insert message into output function 238 for transmission to the appropriate one of the terminals 22, 24, 26, 28 or 34.

Once the user has entered a valid PIN and has been approved by the system, multiple transactions can be carried out without the need to reenter a PIN and be re-approved by the system.

As will be appreciated by those skilled in the art, the ATM/POS system of the present invention will make use of the standard error functions currently available on ATM/POS networks in the prior art. Such error functions and handling, including the new and unique error handling functions necessary for the present invention are described in more detail below.

Security for the electronic mail system 10 is accomplished by the same technique as that normally employed for ATM and/or POS terminals in ATM/POS systems 12. Specifically, security comes from the requirement that a user enter a debit/credit card 48 and security code for each transaction, or by relying on the ATM's ability to retain such information once it has been validated in a preceding transaction. After this user security information has been transmitted to the appropriate institution processor 18, 36 or 46 for verification, that processor's normal error or acceptance procedure occurs. If there is an error, or the user's log-on is invalid, the existing normal error process and messages occur.

If the user is authorized to access the electronic mail system 10, a Transaction Authorization number is created for the transaction in the same fashion as for all other ATM/POS financial transactions, and processing is allowed to continue. The Transaction Authorization number that is generated for system security purposes in the operation of the electronic mail system 10 uses the standard algorithm and process presently used in ATM/POS systems. That Transaction Authorization number serves the same purpose for message transaction as for all other types of transactions occurring in ATM/POS systems 12.

The basic audit trail and recovery oriented processes in the ATM/POS network are not disturbed by the modifications needed to operate the electronic mail system 10. A major advantage of adding the electronic mail system 10 to existing ATM/POS networks in comparison with alternative systems is their relative security due to their existing audit and recovery controls.

As described previously, user access to the electronic mail system 10 is accomplished through interaction with one of the terminal 22, 24, 26, 28 or 34. The actual interface that the user experiences may vary from terminal to terminal within a single ATM/POS system 12 and may also vary among various ATM/POS systems 12. The actual interface presented to the user depends upon the particular programs executed by the various processors including those executed by the microprocessor 120 for controlling the terminals 22, 24, 26, 28 and 34 shown in FIG. 2, and the operating system and application software of the institution processor 18 or 36 shown in FIG. 3. The basic interaction of these systems and the additional implications of the data communication networks 16, 38, 42, 62, 64 that link them is well known as it already forms the process by which ATM/POS systems 12 perform their existing ATM/POS financial functions.

When the terminal 22, 24, 26, 28 or 34 is enabled to allow the user to select a transaction after the user has been allowed access to the electronic mail system 10, the present invention presents the user with a new option in addition to those previously provided by the ATM/POS system 12, that is, the electronic mail capability of the system 10. The electronic mail service choice guides the user through a sequence of steps that allows the creation or retrieval of messages. The electronic mail system 10 also automatically notifies users if messages are waiting for them, without any action required other than the user accessing the ATM/POS system 12 through the terminal 22, 24, 26, 28 or 34. The electronic mail system 10 may automatically display certain types of emergency or high priority messages without the user requesting such display through the terminal 22, 24, 26, 28 or 34.

Whichever option a user selects, i.e., creation of a message or retrieval of a message, a display appears on either the display screen 152 or on the instruction panel and screen 154 of the terminal 22, 24, 26, 28 or 34 that allows the user to select from a menu of choices. These choices constitute either additional menus of more detailed choices, or specific transactions to create or retrieve messages. The organization of the electronic mail system 10 allows certain frequently used transactions to be invoked directly and other transactions to be selected after the display of additional menus. The user indicates the desired action either by pressing keys on the keyboard 144, by writing on the pen pad 146 or by pressing specific function keys 138 or by utilizing other input devices on subsystem 14.

The following list of three menu options are set forth here as examples for pedagogical reasons without any implication that they are either a specific or a complete set of options that must be provided in implementing the electronic mail system 10.

creating messages retrieving/reading messages responding to messages

Message Entry

When creating messages the user must compose the text of the message. Options for creating a message include, but are not limited to, selecting from pre-coded or pre-defined messages using menus as described previously. Messages appearing on the display green 152 and on the instruction panel and screen 154 assist the user in understanding the choices and how to use them. The messages displayed on the display screen 152 and on the instruction panel and screen 154 include "fill-in-the-blank" areas which allow the user to customize standard messages. The types of standard pre-coded "fill-in-the-blank" messages which may be invoked by a menu option include, but are not limited to:

identification messages, telling who called, affiliation, the subject of the call, and how to contact them;

travel messages, describing characteristics of travel such as arrival/departure time, location I.D. (City, State, Country, or Institution such as hotel or business), carrier and the like;

confirmation messages, confirming such things as stock or bond sales or purchases, approval of reservations, and similar activities; and calendar messages, messages to be sent back to the user about scheduled time commitments or actions to be performed, either entered by the user or others, such as a secretary or travel bureau with user granted authority to do so.

Another menu or instruction option provides selection of a broader range of "pre-coded" messages from a credit, debit, plastic or similar type of card 48 that includes a memory and/or a computer. Such cards 48 may include user specific special messages that can be read into the terminal 22, 24, 26, 28 or 34. These types of messages will have the same "fill-in-the-blank" format as the normal "pre-coded" messages of the ATM/POS system 12.

The "fill-in-the-blank" messages are typically completed using the keyboard 144 of the terminal 22, 24, 26, 28 or 34. An alternative is using the pen pad 146, the OCR subsystem 170 for both alphabetic and numeric "fill in the blank" message formats or other available input systems.

Another alternative, the composition and entry of complete or complex messages is achieved by scanning the written message 56 with the OCR subsystem 170, or by hand written or printed entry on the pen pad 146. After the message has been scanned by the OCR subsystem 170, using the keyboard 144 or the pen pad 146 the user can correct or improve the message as read. Status or error conditions in the OCR subsystem 170 are reported through the various display methods previously described.

A final form of capturing messages, or identifying the intended recipient of a message, is to employ a memory card 48 or access card 48 with on board processing capabilities that stores pre-recorded messages or data bases from which messages can be created, and/or a directory of individuals to whom messages can be sent. Such a card 48 is inserted in the debit or credit card reader 136 and a display of various options appears on the display screen 152. The user then chooses among various options using the entry techniques already described to indicate which individuals and messages are desired, and how they are to be associated and further processed.

The user has the option of addressing the message before or after the message text is composed. When addressing the message the user can either enter an addressee mailbox code directly or select an address from a directory of frequently used message destinations stored in a memory or "smart" card 48. At the user's option, addresses may be validated before message transmission. The electronic mail system 10 also allows entry of addresses through the keyboard 144, the pen pad 146, or the OCR subsystem 170. After composing the message text and addressing it, message creation is complete.

Figure 10:
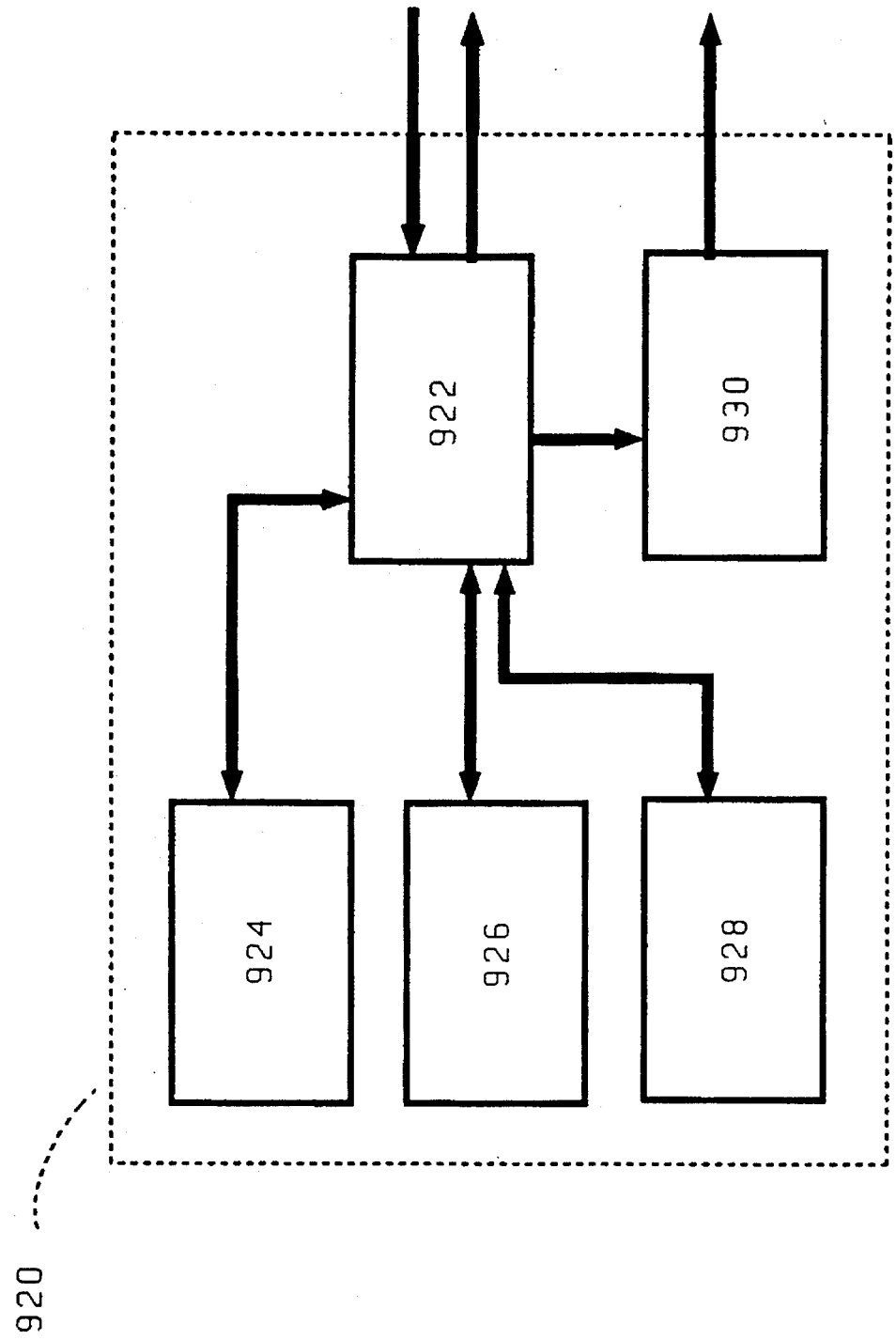
FIG. 10 is a combined block diagram and flow chart depicting a subsystem which generates messages at predetermined times for transmission into the ATM/POS subsystem.

Another method for message creation as illustrated in FIG. 10, uses a message generator 1020. Message generator 1020 includes a control processor 1022 that receives a "control sequence" for generating messages, originated by the user and routed to the control processor from originating/retrieval function 334. The control sequence is a set of commands that can be executed to create messages and requests for information. These sequences are then stored for later use in the control sequence storage function 1024.

The message generator 1020, is activated by a timer 1026 and/or by a set of logical conditions sensed by the logic analyzer function 1028, such as other message activity, which then causes the control processor 1022 to remove a control sequence from storage 1024 and cause it to be executed by the message generation function 1030. If at any time during receipt or execution of a control sequence an error should arise, it is processed by the control processor to the error message function 362.

Message generation function 1030 takes the control sequence command and processes it. This will result in a new message that will be sent into the system by sending it to the validation ID function 352. From this point on, it will be sent through the system as any other message.

Message generation function 1020 allows a user to set up special sequences which will cause messages to be created, on a periodic or logical basis, to send status messages, or to send messages requesting information from other functions or users in system. An example would be to send a message to a brokerage firm on the system to request a stock quote once a day.

Message Retrieval and Response

The user can also direct the system to retrieve messages addressed to the user. By interacting with the terminal 22, 24, 26, 28 or 34 through the keyboard 144 and the function keys 138, retrieved messages appear on the display screen 152 of the terminal 22, 24, 26, 28 or 34. A user may choose to have the printer subsystem 160 print a message on the paper 54. The keyboard 144 or the pen pad 146 may be used to control the message appearing the display screen 152 to allow display of sender/source associated information, the text, or selected portions of such information if the screen cannot display all of the information at once.

The user responds to messages in a manner similar to composing messages. A response may be sent to the original sender, or to new addressees, or both. The response message is created by the same addressing and composing steps as creating any other message, but a response includes additional information about the original message unless the user intentionally deletes such information.

To identify each message for operational and financial purposes, an additional message reference number may be added by the terminal 22, 24, 26, 28 or 34, by the institution processor 18 or 36, or by the processor 18, 36 or 44 providing the message service control function to messages being retrieved from the store and forward message switch 52, or being stored there. If the message comes from an E-Mail system outside the electronic mail system 10, that system's E-Mail reference number can be used on messages stored into the store and forward message switch 52. Furthermore, a system cross reference number may be added if necessary to meet network controls. Such a message reference number may serve the function of identifying each message for operational and financial purposes, and thereby link printed or control documentation to the billing statements that are created by the system.

It is contemplated that the message text carries various information concerning the user, the institution and security authorization for each transaction, including each bill paying transaction. Specifically, the message text may carry a vendor ID code, a bank ID code, a transaction authorization code for the invoice and any other security or validation codes necessary for the security system chosen by the individual bank. This information can be validated in the normal ATM/POS network/bank validation process, or additional validation which may be added to the system. Each bank on the network can choose which validation technique it wishes to use for its customers with minor changes to the existing networks.

The characteristics and components of menus and options on the various information displays described above allow the user to create messages or to retrieve waiting messages, and is a unique improvement to the existing capabilities of the ATM/POS subsystem 14.

All of the entry techniques can be co-mingled with the memory or processor card options to provide great flexibility in the creation, direction and processing of messages and responses. The memory and processor cards 48 can also be used to capture the addressing and text of messages sent to a user, including information concerning the user's calendar or schedule of activities which can be used to update records in a data base housed in memory on such a card 48. Other special types of messages can also be created to update specific associated data bases in memory on such cards 48.

Message Errors

When errors are encountered, the normal processing for the type of the terminal 22, 24, 26, 28 or 34 in use will be followed. For errors that cannot be corrected at the terminal 22, 24, 26, 28 or 34, the ATM/POS subsystem 14 clears all status and waiting actions and then resets, rejecting all further attempts to process the erroneous transaction. In addition, the normal timeout interval for handling problems such as the occurrence of a network error remains the same.

Store and Forward Message Switch 52

Figure 4:
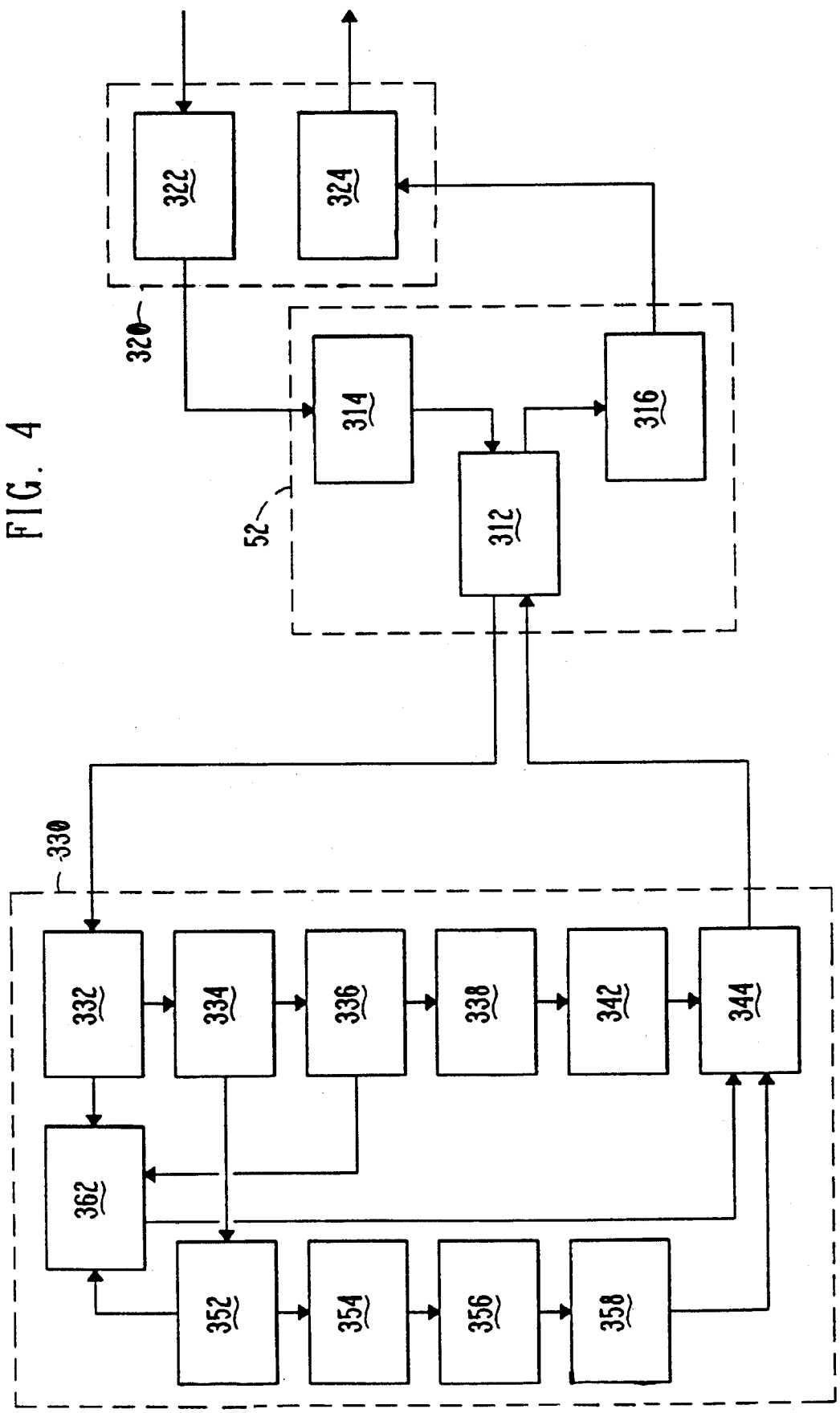
FIG. 4 is a combined block diagram and flow chart depicting the store and forward message switch illustrated in FIG. 1 together with the functions performed by the switch in providing electronic mail services.

FIG. 4 is a combined block diagram and flow chart depicting the store and forward message switch 52 of FIG. 1. The store and forward message switch 52 includes a CPU 312 that includes a memory, similar to the memory 126 included in the microprocessor 120 of FIG. 2, and also an ALU, similar to the ALU 128 included in the microprocessor 120. The CPU 312 receives data from an input 314 included in the store and forward message switch 52 and transmits data to an output 316 also included in the store and forward message switch 52.

A communications controller 320 interfaces between the store and forward message switch 52 and the data communication networks 42 or 64. The communications controller 320 includes an input buffer 322 that receives transactions from the communication networks 42 or 64 and transmits them to the input 314 of the store and forward message switch 52. Similarly, the communications controller 320 includes an output buffer 324 that receives transactions from the output 316 of the store and forward message switch 52 and transmits them to the communication networks 42 or 64.

In FIG. 4, a dashed line box 330 encloses a flow chart of the computer program executed by the CPU 312 of the store and forward message switch 52. The flow chart 330 sets forth the various functions performed by the store and forward message switch 52. The specific functions depicted in the flow chart 330 support the electronic mail system 10 of the present invention and, illustrate the interrelationship between the electronic mail system 10 and external store and forward or E-Mail systems and the communication networks 42 and 64. The functions depicted in the flow chart 330 also specifically depict the message editing, capture, storage and forwarding capabilities and functions of the electronic mail system 10. It will be understood by those skilled in the art that the functions performed by the store and forward message switch 52 that are needed to support the electronic mail system 10 of the present invention can be developed as a completely new system, or can be obtained by modifying an existing E-Mail or Store and Forward Message Switch system (including its various local and remote components) to perform the required message handling functions.

Communications with the Store and Forward Message Switch 52

The first function performed by the store and forward message switch 52 in processing a transaction is a validate I.D. and password from the financial institution function 332. The validate I.D. and password from the financial institution function 332 is compatible with the message service control function performed by the clearing house network processor 44. The validate I.D. and password from the financial institution function 332 allows the store and forward message switch 52 to identify message service users with the transmission of a minimal amount of information about the user that is extracted from their debit/credit card account records or provided by the message service control function of the clearing house network processor 44. The information so transmitted includes the user's account I.D. and password on the store and forward message switch 52. Another validation that can be performed is a series of logical verifications of the message, such as determining if a date for a meeting is a date that has already passed. In such cases, an error function will be invoked. After the validate I.D. and password from the financial institution function 332 determines that a transaction is for a user of the electronic mail system 10, it then performs an origination or retrieval function 334 to determine whether the user has entered a message at the terminal or is requesting that any waiting messages be transmitted.

Message Retrieval

If a transaction specifies that the user is retrieving messages, then the store and forward message switch 52 performs a check mailbox for messages function 336. The check mailbox for messages function 336 queries the users mailbox to determine if there are any messages waiting for delivery. Performing the check mailbox for messages function 336 includes determining the status of all waiting messages and their respective priorities, selecting the next message to be transmitted to the user, and adding to the message being transmitted any additional status information to be sent to the user.

After performing the check mailbox for messages function 336, the store and forward message switch 52 performs a format messages for ATM/POS function 338. The format messages for ATM/POS function 338 uses information that accompanies each message retrieval request received from the message service control function on the clearing house network processor 44 to determine how the message should be formatted, and what additional information about other messages (such as their number, emergency nature or degree of priority, etc.) needs to be added to the messages being transmitted to the user at the terminal 22, 24, 26, 28 or 34. Responsive to information provided to the store and forward message switch 52 by the message control function performed on the clearing house network processor 44, the format messages for ATM/POS function 338 prepares each message in a format specifically for the particular type of terminal 22, 24, 26, 28 or 34 presently servicing the user.

Figure 9:
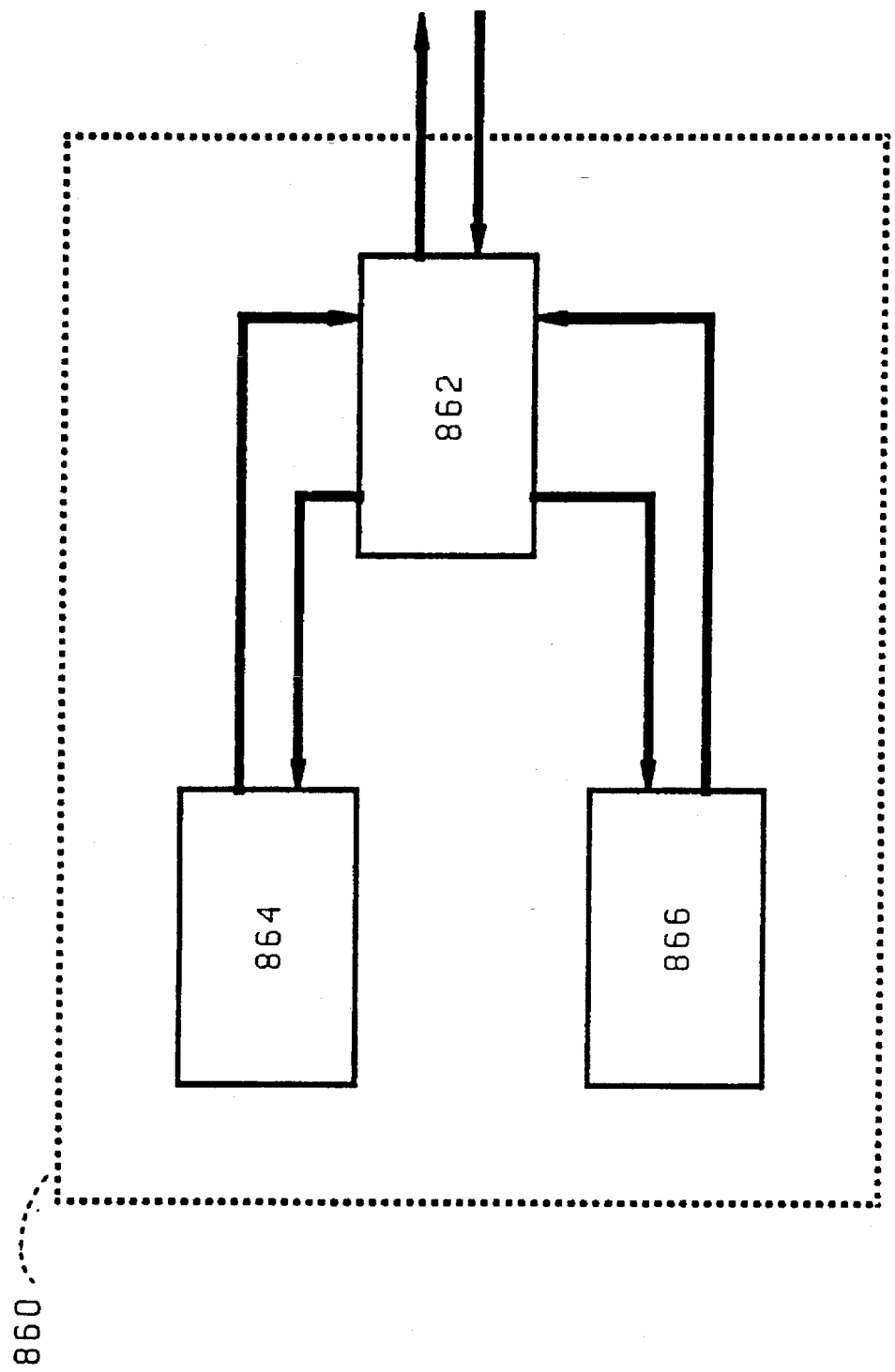
FIG. 9 is a combined block diagram and flow chart depicting a subsystem which expands and translates messages for transmission into the ATM/POS subsystem.

An additional processing function 860 (depicted in FIG. 9) expands and translates messages in response to certain conditions and commands provided in the message format or by input from subsystem 14. The processing function 860 contains a command processor 862 which interprets the commands to determine the type of translation or other processing that is required. This command processor 862 receives the messages and commands for message format process 338 depicted in the computer flow chart 330. The command processor will activate the logic in a decode function 864 depending on the command. The decode function 864 will expand certain codes in the message format into "plain text" for transmission to the requesting user either located at an ATM/POS subsystem 14 or a computer terminal subsystem 72. For example code 33 might be expanded to "I cannot make the meeting." After the decoding is complete, subsystem 864 will return the decoded message back to the command processor 862 which will send it back to the message format function 338 which will continue its processing.

The command processing function 862 will activate the logic language translation function 866 depending on the command provided to it. The language translation function 866 will receive the message from the command processor 862 and utilizing commercially available language translation algorithms, it will translate the requested message from the message switch 52 language, typically the language of the country the message switch 52 is located, to another language specified by the command processor 862. In addition, the translation function can change the message script or character type, e.g. from Roman characters to Katakana characters or the like. The translation function 866 will then return the translated message back to the command processor 862 which will send it back to the message format function 338 which will continue its processing.

After the store and forward message switch 52 performs the format messages for ATM/POS function 338, it then performs a flag message status function 342. The flag message status function 342 updates records in the user mailbox to identify what messages and other information are being transmitted to the user. This update permits error recovery if validation of message delivery is not received back from the terminal 22, 24, 26, 28 or 34.

After performing the flag message status function 342, the store and forward message switch 52 performs an insert message into output function 344. The insert message into output function 344 transmits the message to the message service control function on the clearing house network processor 44 for delivery to the terminal 22, 24, 26, 28 or 34 servicing the user.

Message Transmission

If a transaction specifies that the user is transmitting a message, then after the store and forward message switch 52 performs the origination or retrieval function 334 it performs a validate destination I.D. function 352. The validate destination I.D. function 352 determines the desired destination for the message. This destination can be within the store and forward message switch 52 that is providing the E-Mail capability for the electronic mail system 10, it can be any other E-Mail system connected through industry Standard X.400 links or any other custom E-Mail to E-Mail link, or it can be a facsimile machine. After determining the proper destinations, the validate destination I.D. function 352 routes the message to the appropriate destinations.

Once the message has been routed by the validate destination I.D. function 352, the store and forward message switch 52 performs a format for mailbox function 354. The format for mailbox function 354 determines the destination mailbox type and rearranges the message as necessary to be acceptable for that mailbox. The format for mailbox function 354 takes certain encrypted information about the message as originated by the user, possibly including data added by the message service control function, and decodes it into text within the message being transmitted. This encrypted information includes, but is not limited to, date, time, location of the terminal 22, 24, 26, 28 or 34 servicing the user, associated information about the original message if this message is a response to a prior message, and directions for further delivery or action by the recipient that are specified for this user as determined by the message service control function performed by the clearing house network processor 44 or by the user's account records or alternatively by the standard ATM/POS functions if the action initiated is a financial transaction. The format for mailbox function 354 may be performed as pan of the message service control function if so desired.

After performing the format for mailbox function 354, the store and forward message switch 52 performs a flag message status function 356. The flag message status function 356 logs the message, updates the user E-Mail mailbox for information about the transmission of the message, and executes and terminates any external E-Mail links that were established to transmit the message. Alternatively, if the user has specified that the message's recipient is to be a facsimile machine, the store and forward message switch 52 accesses the public or private telephone system through the modem 76 using either hard wired or wireless facilities and the facsimile transmission machine 82 to establish connection with the desired facsimile machine to transmit the message.

After completing the flag message status function 356, the store and forward message switch 52 performs a return acknowledgement function 358. The return acknowledgement function 358 completes the message transmission process by providing an audit trail of successful transmission, or it identifies and transmits any standard E-Mail errors that occurred in transmitting the message after the store and forward message switch 52 validated the destination I.D. by performing the validate I.D. and password from the financial institution function 332. The return acknowledgement function 358 provides this information that is necessary for further services to this user by the electronic mail system 10 to the message service control function on the clearing house network processor 44. The return acknowledgement function 358 also constructs an appropriate return message and the insert message into output function 344 then transmits the message back through the message service control function on the clearing house network processor 44 for ultimate delivery to the terminal 22, 24, 26, 28 or 34 servicing the user.

Error Handling

Even though validity checks are performed on each request at the user account and request processing levels, certain basic errors are still possible and must be handled. If the store and forward message switch 52 is unable to validate a user's I.D. or password, an appropriate message must be generated by an error messages function 362 and sent back through the message service control function on the clearing house network processor 44 for logging to the user's account and for transmission to the terminal 22, 24, 26, 28 or 34 servicing the user. This logging procedure assures that the electronic mail system 10 can recover in an orderly manner in attempting to remedy any problem. If the check mailbox for messages function 336 determines that there are no messages for a user, this "no messages" condition may be processed as an error through the error messages function 362. If the validate destination I.D. function 352 determines that the user is attempting to send a message to an invalid destination I.D., to maximize the user friendliness of the electronic mail system 10 this type of error is handled in a manner that requires the user to re-enter only the correct destination I.D. necessary to properly resend the message. The error messages function 362 also handles other normal E-Mail errors with specific messages responsive to those errors being transmitted to the terminal 22, 24, 26, 28 or 34 servicing the user.

Clearing House Network Processor 44

FIG. 5 is a combined block diagram and flow chart depicting the clearing house network processor 44 of FIG. 1. The clearing house network processor 44 includes a CPU 412 that includes a memory, similar to the memory 126 included in the microprocessor 120 of FIG. 2, and also an ALU, similar to the ALU 128 included in the microprocessor 120. The CPU 412 receives data from an input 414 included in the clearing house network processor 44 and transmits data to an output 416 also included in the clearing house network processor 44.

A communications controller 420 interfaces between the clearing house network processor 44 and the data communication network 42. The communications controller 420 includes an input buffer 422 that receives transactions from the communication network 42 and transmits them to the input 414 of the clearing house network processor 44. Similarly, the communications controller 420 includes an output buffer 424 that receives transactions from the output 416 of the clearing house network processor 44 and transmits them to the communication network 42.

In FIG. 5, a dashed line box 430 encloses a flow chart of the computer program executed by the CPU 412 of the clearing house network processor 44. The flow chart 430 sets forth the various functions performed by the clearing house network processor 44. The specific functions depicted in the flow chart 430 support the electronic mail system 10 and specifically the message service control function of the present invention.

Standard ATM/POS Network Functions

The first step performed by the clearing house network processor 44 in processing message transactions is the standard validation of the account I.D. and PIN. (This function is not depicted in FIG. 5.) This validation function is performed in the manner described above for the validate user function 234 performed by the institution processor 18 or 36. After successful validation, the electronic mail system 10 is then authorized by the approval received back from the user's financial institution processor 46 to process message transactions for the user.

When the user thereafter transmits a message service request, along with all other transactions, the clearing house network processor 44 validates the authorization code by performing a validate authorization code and institution function 432. After the user's authorization has been validated, the transaction is then logged by a log transaction for recovery function 434. After the message has been logged for recovery, the clearing house network processor 44 performs an identify institution affiliation function 436 to identify the appropriate institution to which the user's charges for using the electronic mail system 10 and its associated financial transactions and charges are to be forwarded.

Message Service Control Function

After the clearing house network processor 44 completes the preceding functions, the message transaction is further processed by the message service control function. Processing of transactions by the message service control function on the clearing house network processor 44 is different than the processing of other non-message service transactions such as financial transactions by the clearing house network processor 44. For each message service transaction, the message service control function creates multiple new message retrieval, message transmission and/or account update transactions that are required to fully perform message transactions. The message service control function allows these new transactions to be separated for sequential processing of the message handling transactions and of charging transactions against the user's account on the user's financial institution processor 46.

To create these multiple new transactions when a message service request transaction arrives from the terminal 22, 24, 26, 28 or 34, the clearing house network processor 44 performs a process transaction for control function 442. The process transaction for control function 442 logs the existence of message service request and retains sufficient information to track the status and steps required to complete the electronic mail transmission. Logging the message service request allows for orderly recovery if a error occurs during subsequent processing of the request. If account validation has not previously occurred, the process transaction for control function 442 invokes this process that is described previously herein. The account validation process acquires information about the validity of message processing for this user, and other information about service scope, address, and the like.

After the clearing house network processor 44 performs the process transaction for control function 442, it then performs a process transaction for completion function 444. The process transaction for completion function 444 initiates the message service transaction(s) performed by the store and forward message switch 52 as described above in connection with FIG. 4. Upon completion of the process transaction for completion function 444, a process transaction destination function 446 is carried out. This function performs the proper logic and routing steps to allow processing to continue as well known in the current state of the art in the ATM/POS field.

After the process transaction destination function 446 has been performed, the clearing house network processor 44 performs an insert message into output function 448. The insert message into output function 448 transmits message service transactions to the store and forward message switch 52.

When a response transaction to a message service transaction returns to the clearing house network processor 44 from the store and forward message switch 52, it is processed through the validate authorization code and institution function 432, the log transaction for recovery function 434 and the identify institution affiliation function 436 to the process transaction for control function 442. Upon receipt of the message service transaction, the process transaction for control function 442 recognizes that it is a response to a message service transaction initiated previously by the clearing house network processor 44. The process transaction for control function 442, therefore, updates the status of its prior request and then forward the transaction to the process transaction for completion function 444. Normally processing of the response to a message service transaction by the process transaction for control function 442 satisfies the functional requirements for message transactions other than returning the message to the terminal 22, 24, 26, 28 or 34 servicing the user. However when errors, special circumstances, or complex transactions occur, additional cycles of communication between the clearing house network processor 44 and the store and forward message switch 52 may be required.

Before forwarding a message transaction to the terminal 22, 24, 26, 28 or 34, the process transaction for completion function 444 initiates a financial transaction to charge the user for services provided by the electronic mail system 10. This financial transaction is processed in the same manner as other financial transactions from the ATM/POS system 12 that pass through the clearing house network processor 44.

When the acknowledgement returns from the user's financial institution processor 46, the message service request will be closed out by the process transaction for control function 442. After the process transaction for control function 442 closes the message service request, the process transaction for completion function 444 transmits the message back to the terminal 22, 24, 26, 28 or 34 servicing the user. The return transaction to the terminal 22, 24, 26, 28 or 34 includes either the status of the messages entered by the user or the messages (if any) that have been retrieved from the store and forward message switch 52. The return transaction to the terminal 22, 24, 26, 28 or 34 also indicates the charges made to the user's account for use of the electronic mail system 10.

Error handling and correction will be performed by the error function 501 which, as will be appreciated by those skilled in the art, is well known in the state of the ATM/POS art and currently incorporated in available ATM/POS systems.

User's Financial Institution Processor 46

Figure 6:
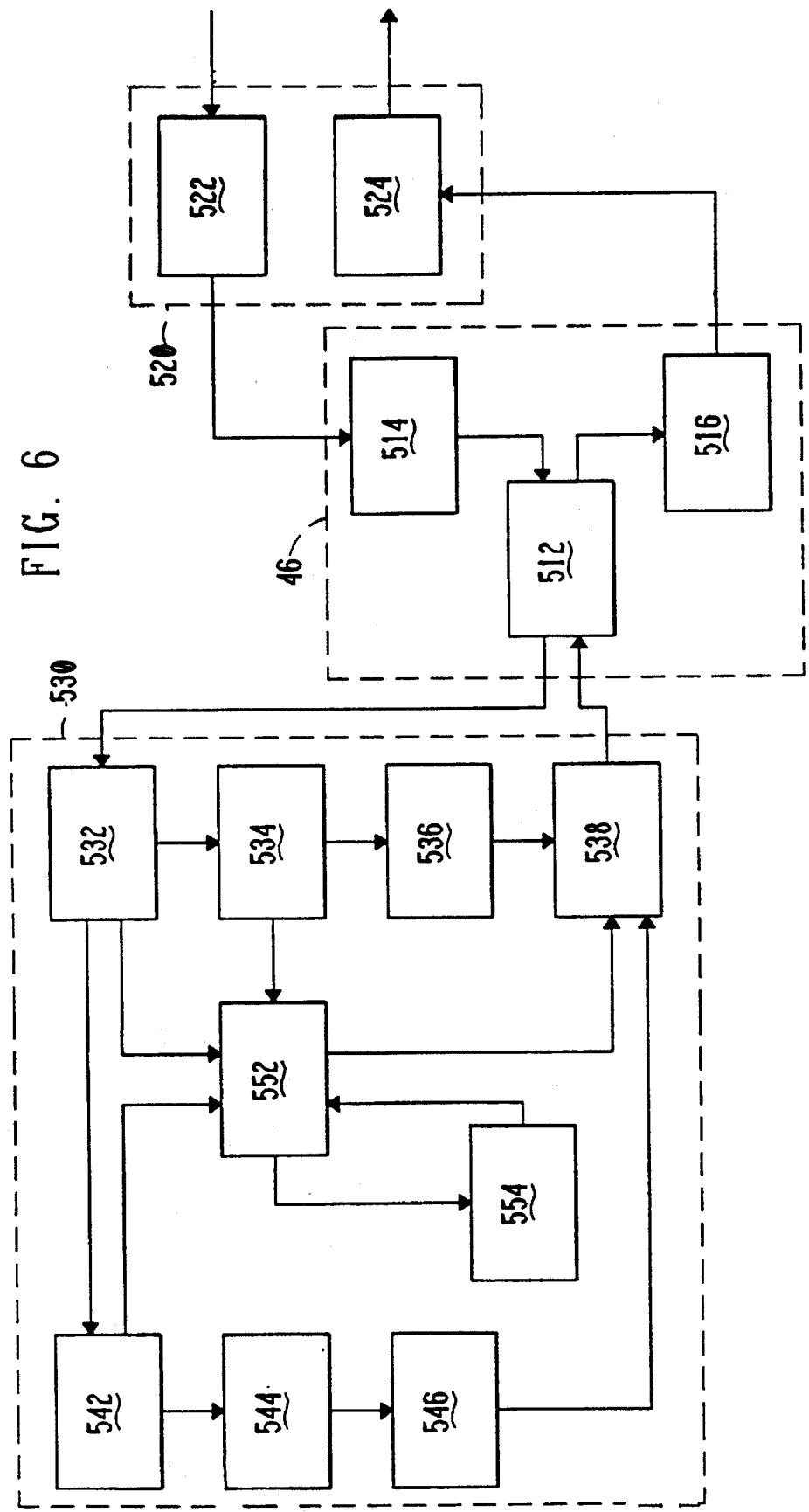
FIG. 6 is a combined block diagram and flow chart depicting the user's financial institution processor system illustrated in FIG. 1 together with the functions performed by that processor in providing electronic mail services.

FIG. 6 is a combined block diagram and flow chart depicting the user's financial institution processor 46 of FIG. 1. The user's financial institution processor 46 includes a CPU 512 that includes a memory, similar to the memory 126 included in the microprocessor 120 of FIG. 2, and also an ALU, similar to the ALU 128 included in the microprocessor 120. The CPU 512 receives data from an input 514 included in the user's financial institution processor 46 and transmits data to an output 516 also included in the user's financial institution processor 46.

A communications controller 520 interfaces between the user's financial institution processor 46 and the data communication network 42. The communications controller 520 includes an input buffer 522 that receives transactions from the communication network 42 and transmits them to the input 514 of the user's financial institution processor 46. Similarly, the communications controller 520 includes an output buffer 524 that receives transactions from the output 516 of the user's financial institution processor 46 and transmits them to the communication network 42.

In FIG. 5, a dashed line box 530 encloses a flow chart of the computer program executed by the CPU 512 of the user's financial institution processor 46. The flow chart 530 sets forth the functions performed by the user's financial institution processor 46 that support the electronic mail system 10, specifically the process by which users are charged for their use of the electronic mail system 10.

Identifying a Message Service User

Upon receiving a financial transaction, the user's financial institution processor 46 performs a log transaction for recovery function 532. The log transaction for recovery function 532 provides the normal audit trail processing for financial transactions that permits recovery if a error occurs during processing.

The validate user function 534 will validate the user's account number and determine whether the user has a message on the system.

If the ATM/POS system 12 transmits a message initiation and account verification transaction directly to the user's financial institution processor 46 via the user authorization data communication network 62, then a format external message request function 536 handles the special processing associated with the new message transaction types. This processing performed by the format external message request function 536 is similar to the processing described above if the terminal 22, 24, 26, 28 or 34 servicing the user is attached to the user's financial institution processor 46. However, when the terminal 22, 24, 26, 28 or 34 servicing the user is different from the user's financial institution processor 46, the user's financial institution processor 46 must communicate information to the message service control function on the clearing house network processor 44 to identify both the institution processor 18 or 36 and the store and forward message switch 52 that are to be involved in responding to this user's requests, including the user's account I.D. and password on the store and forward message switch 52. There are two different ways in which the user's financial institution processor 46 may provide this information.

One option will be to transmit forwarding identification information through the format of the transaction in order to minimize the processing differences. When a message transaction is identified it will be forwarded through the network and processed by message service control function, communicating specific account related information necessary to provide the messaging service.

In the second alternative, the message service control function is associated with the clearing house data communication network 42. In this second alternative, the response to an account query comes from the format external message request function 536 performed by the institution processor 18 or 36, and the transaction is not further processed by the message service control function on the clearing house network processor 44, but merely satisfies the request of the clearing house network processor 44 for account validation. This second alternative may be chosen by organizations that wish to minimize the impact of the electronic mail system 10 on their financial systems by merely providing billing and account validation to the system 10.

In either case, after approval of a user to use the electronic mail system 10, the message service control function handles all further control relationship with the appropriate institution processor 18 or 36 and the store and forward message switch 52. The appropriate debit or credit to the user's account is the only further transaction required between the clearing house network processor 44 and the user's financial institution processor 46.

A third alternative allows billing to be associated with the user's account on the store and forward message switch 52.

Under such circumstances, the user's financial institution processor 46 merely validates the user's account I.D. and password on the store and forward message switch 52. In any case, after such processing the insert message into output function 538 then take over placing the message into a condition for appropriate output from the system. This function, as will be appreciated by those skilled in the art, is currently available on ATM and POS systems. Such function will be used in the system of the present invention. Each bank on the network may determine the extent of additional validation necessary for billing transactions to third parties, but this is external to the message system as it is a standard ATM/POS type of transaction.

Billing the User

After messages have been processed by the store and forward message switch 52 and are ready to be returned to the terminal 22, 24, 26, 28 or 34 servicing the user, the message service control function on the clearing house network processor 44 transmits the financial transaction to the user's financial institution processor 46. The log transaction for recovery function 532 on the user's financial institution processor 46 logs this financial transaction and forwards it to a receive message charges function 542 for further processing. The receive message charges function 542 identifies the charges and formats them for updating the user's account records. A process account debit function 544 uses the information prepared by the receive message charges function 542 to update all appropriate records by entering the users charges, and to create an audit trail of the financial transactions. After the financial records are updated and the audit Wail created, a process message service completion function 546 closes out processing on the user's financial institution processor 46 and, through the insert message into output function 538, transmits a transaction acknowledging successful completion to the message service control function on the clearing house network processor 44.

Correcting Billing Errors

If the message service control function on the clearing house network processor 44 is unable to deliver messages to the user at the terminal 22, 24, 26, 28 or 34, either a credit or a reversal of charges must be processed by the electronic mail system 10. This circumstance is handled as an error transaction and processed by an errors function 552 on the user's financial institution processor 46. The user's financial institution processor 46 will provide all appropriate logging and controls as described above to audit such a problem. After proper validation of the circumstances, a process account debit function 554 updates the appropriate records to reverse any charges that have already been recorded for the failed transmission. After the process account debit function 554 has reversed any charges, the errors function 552 sends a transaction indicating this fact back to the message service control function on the clearing house network processor 44 through the insert message into output function 538.

All other errors are handled by the error function currently available on state of the art ATM/POS systems; as previously described.

MESSAGE SERVICE FLOW

Logging onto the Electronic Mail System 10

The process of receiving or sending a message is initiated by a user entering the debit or credit card 48 into the terminal 22, 24, 26, 28 or 34 of the ATM/POS system 12 included in the electronic mail system 10. After the user enters his PIN or other security password, the terminal 22, 24, 26, 28 or 34 captures all data about user identification, security, and the user's desire to retrieve or enter messages. The information captured by the terminal 22, 24, 26, 28 or 34 passes through the institution processor 18 or 36 directly to the clearing house network processor 44 via the clearing house data communication network 42. To obtain authorization for the user to use the electronic mail system 10, the message service control function on the clearing house network processor 44 requests such authorization from the user's financial institution processor 46.

When the user's financial institution processor 46 receives a request seeking authorization for one of its user to use the electronic mail system 10, it interrogates that user's account records. If the user's account records indicate that the user is allowed to use the system, the user's financial institution processor 46 transmits a transaction back to the message service control function on the clearing house network processor 44 authorizing use of the electronic mail system 10. Once the message service control function on the clearing house network processor 44 receives authorization from the user's financial institution processor 46, the message service control function handles all further control relationships with the appropriate institution processor 18 or 36 and with the store and forward message switch 52.

Upon being authorized to use the electronic mail system 10, the user is notified if there are any messages waiting for him on the store and forward message switch 52. At this time the user is prompted to "read" his mail, and is allowed to respond to each messages.

Retrieving a Message

The message service control function of the clearing house network processor 44 also transmits debit or credit transactions to the user's financial institution processor 46.

Transmitting a Message or Response

The message service control function of the clearing house network processor 44 also transmits debit or credit transactions to the user's financial institution processor 46.

SUMMARY OF SYSTEM OPERATION

This section of the application will provide an overview and summary of the system operation. This summary will assume the readers knowledge of the details described at length above.

Logging On To The System

The process of receiving or sending a communication is initiated by a user entering a debit or credit card into the terminal 22, 24, 26, 28 or 34 of an institution connected to the system. After the user enters a personal identification number ("PIN") or other security password, the terminal captures all data about identification, security and the desire to retrieve or enter messages.

The transaction authorization number generated for system security will utilize the standard algorithm and process used for all transactions in these ATM/POS networks. It will serve the same purpose for this type of transaction as for all other transactions.

The information passes through the local information processor which communicates indirectly through the clearing house network processor 44 via an associated ATM or POS processor 18 or 36, and appropriate data communication network, to the user's financial institution processor 46.

Identifying a Message Service

Information about the user's message I.D. is retrieved from his account in the user's financial institution processor 46.

When a transaction for message initiation and account verification is transmitted to the user's financial institution processor 46 to invoke approval for the message service control function then the format external message request function 236 will handle the special processing associated with the new message transaction types, after the log transaction for recovery function 232 performs its normal audit trail and recovery processing.

After it is determined that the user is approved for the service, the message service control function will handle all further control relationships with the appropriate terminal control processor and the store and forward message switch 52, and the debit or credit to the user's account will be the only required additional function of the user's financial institution processor 46 and related components.

The ATM/POS user will be told in response to the log-on prompt if messages are waiting. When this function is invoked, he will be prompted to "read" his mail, and allowed to respond to each message, if desired.

OPERATING THE TERMINAL

Selecting The Message Options

When the user is asked to "select transaction", a new option provided by this invention on the ATM/POS terminal screens will guide the user into a sequence that will allow the creation or retrieval of messages through the functions provided. It will also automatically notify users of the message service if messages are waiting for them, without any action required other than the user logging on to the ATM/POS terminal, as described above. It can also allow certain types of emergency or high priority messages to be automatically displayed.

Whichever option is selected, creation or retrieval will cause the terminal system to display on screen 152 or panel 154 further options from which to select. These options will constitute either menus or more detailed choices or specific transactions that will create or retrieve messages. The preferred construction will allow certain frequently used transactions to be invoked directly and other transactions to be selected after further menu display. The user may indicate the desired action by pressing keys on the keyboard 144, writing on the pen/pad 146 or pressing specific function keys 138.

Creating Messages

When creating messages a key function is composing the text. Options for selecting from pre-coded or pre-defined messages will be provided through the techniques described earlier, and the user will be assisted by the simultaneous use of the display screen 152 and the instruction panel 154 to aid in understanding the choices and how to use them. These messages may include "fill-in-the-blank" areas to allow the message to be customized.

Another menu of instruction option will allow selection of a broader range of "pre-coded" messages from an optional magnetic card which may have on board memory or an on board processor. Such a card can include user specific special messages that can be pulled into the ATM/POS terminal. These messages may have the same "fill-in-the-blank" capability as the terminals normal "pre-coded" messages.

The "fill-in-the-blank" messages will normally be completed using the numeric key pad of the ATM/POS terminal. Another option is to allow use of the pen pad 146 or an optical character reader (OCR) for both alphabetic and numeric "fill-in-the-blank" capability.

The composition and entry of complete or complex messages may be accomplished by optical character recognition scanning of the message, or by hand written entry on a pen pad such as pen pad 146.

The user will have the option of addressing the message before or after the message text is composed. When addressing the message, the user can either enter the addressee mailbox code directly or use a magnetic card, as described above, which includes an on board directory of message destinations that are used frequently, and select from these. At the user's option, addresses may be validated before message transmission. Addressee information may also be captured through the pen pad 146 or the OCR. After composing the message text and addressing it, message creation is complete.

Retrieving And Reading Message

The user can also direct the system to retrieve messages addressed to the user's mailbox. By interacting with the terminal through its keyboard and function keys, the messages retrieved are displayed on the video display of the terminal At the user's option, each message may be printed out by indicating the desired action through the appropriate keys. Reading of a message can be controlled through use of the keyboard and function keys.

Responding To Messages

The user responds to messages through a process similar to composing messages, with the only variation being that addressing the message is a modified process. Response may be to the original sender, or to new addressees, or both. The response message is created by the same addressing and composing steps as creating any normal message. The response can also be the initiation of a financial transaction such as paying bills, purchasing stock or other items, or other EDI capabilities, as well as transferring funds or other normal ATM/POS transactions. The composing actions are identical to the composing actions during the step of creating a message as described above.

Complex Message Techniques

All of the above entry techniques can be combined with the magnetic card options as described above to provide great flexibility in the creation and direction of messages. The magnetic card can also be used to capture the addressing and text of messages sent to the user, and particularly information about the calendar or schedule of activities which can be used to update recorded records. Other special types of messages can also be created to update specific associated data bases stored on the magnetic card.

In addition, it is contemplated that messages may be sent and retrieved through a touch tone telephone. Messages may be sent by calling the messaging system automated terminal which is pan of the system and has access to the network. The automated terminal may include a voice response unit and/or a modem with an associated touch tone decoder. The voice response unit and modem combination would attend the call and the touch tone decoder would translate the user responses through a touch tone pad of a standard touch tone telephone. These decoder signals would be used to communicate with an associated computer to send and store messages on the system as previously described for on ATM or POS In addition, both sending and receiving of messages may take place through a fully automated computer -operator. Such a system may function through use of a telephone touch tone pad or may be operated solely through user voice activation and a synthesized human voice controlled by the automated operator. This would allow messages to be both sent and received over standard telephone lines.

While these automated functions are not specifically illustrated in the drawings, it is contemplated that such an automated system would reside as a node similar to the service bureau and be entered via telephone, such as telephone 84.

MESSAGE TRANSACTION FLOW

Starting Message Service Control

When transmitted to the ATM Institution processor by the micro-processor of the ATM/POS terminal in response to completion of the user entry at the terminal, the message transaction will be formatted for transmission through the network. The message service control function will direct the message in accordance with normal system requirements, but using the new transaction types and transaction formats.

Invoking the message service control function will be accomplished by the format external message request function 236. This process will handle the special processing associated with the new message transaction types.

The destination will be identified using a location/affiliation directory. Information for the message service control function will be encoded and included in the message including an identification of the terminal location, date, time and other information that becomes an associated part of the message function and its audit trail. This information is used by both the message service control function and the store and forward message switch or equivalent E-Mail system.

Liking The Message Switch To The Message Service Control Function

The link between the revised validated I.D. and password from bank process 405 and the message service control function of the clearing house network adds the validation necessary for the new service. This added validation will allow the store and forward message switch 52 to identify system users and their password by transmission of a minimal amount of information about the user as extracted from their debit/credit card account records or from message service control function including their E-Mail account I.D. password or PIN. When the store and forward message switch 52 has identified the user as system user, it is then determined by the origination or retrieval function 334 whether the user has entered a message at the terminal, or is requesting that any mail waiting be transmitted. The appropriate control process will then be selected.

Retrieving Messages From The Users Mailbox

When information that the user is approved is passed back to the message service control function from the clearing house network processor 32, message service control function then query's the store and forward message switch 52 for information held in the user's I.D. account or mailbox in that system.

If the process required is message retrieval, then the check mailbox for messages function 336 will process the users mailbox to determine if there are any messages waiting for delivery, it will determine, what status exists for all messages, determine priority, and select the next message to be sent. In addition the check mailbox for messages function 336 will determine what other status information needs to be appended to the communication back to the user.

The format messages for ATM/POS function 338 will then use information from the message service control function, sent along with the retrieval request, to determine how the message should be formatted, and what associated information about other messages (such as their number, emergency nature or degree or priority, etc.) needs to be attached to the actual messages being returned. The formatting will be specific to the type of terminal that message service control function informs the store and forward message switch 52 is being used by the user.

The flag message status function 342 will then update records in the user mailbox to identify what is being transmitted to the user. This update will also allow for error recovery if validation of delivery is not received.

The insert message into output function 344 will then transmit the message back to the message service control function for delivery to the ATM/POS terminal where the user is located.

A group of messages (one transaction) are then passed back to the terminal at which the user has entered his request by the message service control function. The store and forward message switch 52 updates a status code for messages delivered to indicate that they have been sent and are awaiting further instructions from the user as to final disposition.

The message service control function will process the response, and return the result to the processor for the ATM or POS terminal where the user is located. This returned transaction will be logged by the log transaction for recovery function 232, exactly as all other traffic within the ATM/POS network.

The receive messages or timeout function 252 will process the returning transaction. This standard function will be modified to handle the message transactions for all normal transaction functions, and then route them to format messages for terminal function 254 for the new handling needed. This process will take information from the message service control function, the user's account profile, the E-Mail system or store and forward message switch 52 as required and format the information to be handled by the specific terminal from which the user originated the transaction.

Formatted responses will then be fed to the user's terminal in association with the capabilities of the terminal, by forwarding them to the transmit response to terminal function 256, a standard process for these networks. The interaction with the terminal will be modified to accept the new message transaction types required by the present invention.

Sending Messages To a Mailbox from a Terminal

When information that the user is approved is passed back to the message service control function by the clearing house network processor 44, the message service control function then notifies the store and forward message switch 52 of messages that have been created for delivery to other mailbox holders within the system, or within its addressing window.

If the process required is origination of messages, then the validate destination I.D. function will determine the destination of the message desired. This destination can be within the store and forward message switch 52 that is providing the E-Mail capability for the system or it can be any other E-Mail system connected through industry Standard X.400 links, or any other custom E-Mail to E-Mail link, or an external fax machine or modem. This will be determined and the appropriate routing to the E-mail destination mailbox or location established.

The format for mailbox function 354 will determine the destination mailbox type and rearrange the message as necessary to be acceptable for that mailbox. It will include taking certain encrypted information about the message as originated by the user, and data added from the message service control function, and turn it into text within the message being transmitted. This information will include, but not be limited to, date, time, location of user or terminal, associated information about the original message if this is itself a response, and directions for further delivery or action by the recipient that are user specific as identified by message service control function or the user's account records.

The flag message status function 356 will log the message, update the user E-Mail mailbox for information about the transmission of the message, and execute and terminate any external E-Mail links that were established for transmission purposes.

The return acknowledgement function 358 will complete the process by communicating back to the message service control function the audit trail of successful transmission, or identify and transmit any standard E-Mail errors that were encountered in transmission, after the destination I.D. was validated.

The appropriate return message will be constructed and the insert message into output function 344 will then transmit the message back to the message service control function for delivery to the ATM/POS terminal where the user is located.

COMPLETION OF MESSAGE PROCESSING

Final Transmission to the Terminal

At the point when the final transaction is being sent back to the terminal, handling will be different than other types of transactions that are either financial or non-financial but not a message service transaction.

The functions to handle this include the process transaction for control function 442 and the process transaction for completion function 444. The initial processing occurs when the transaction comes from the terminal. This causes process transaction for control function 442 to log the existence of a message service request, and retain enough information to keep track of the further handling needed. The process transaction for completion function 444 then initiates the first type of the transaction required, the non-financial transaction routed to the store and forward message switch 52 to capture the E-Mail messages that exist, or to send the messages entered by the user, which has been described earlier.

When the transaction response returns it passes through the normal validation, logging, and identification processes. The process transaction for control will then recognize that it is a response to its initiated transaction, it will update the status of the request and forward the information to the process transaction for completion function. Normally this will satisfy the functional requirements for processing the non-financial transactions. However, when appropriate due to errors, special circumstances or complex transactions, additional cycles of communicating with the store and forward message switch 52 may be required.

The process transaction for completion function 444 then initiates the financial transaction to enter charges to the user account. This will adhere to the normal audit controls of the ATM/POS financial network for monetary transactions.

The log transaction for recovery function 434 provides the normal audit trial processing for this financial transaction, and the type of transaction causes further processing by the receive message charges function 542. Charges will be identified and formatted for update to the account records of the user. The process account debit function 544 updates all appropriate records to indicate the users charges, and creates the audit trail required by the system. The process message service completion function 546 closes out processing on the user's financial institution processor 46 and transmits acknowledgement of the success through a transaction returned to the message service control function through the standard ATM/POS network capability provided by the message into output function 538.

When an acknowledgement returns from the user's financial institution, the message will be closed out by the process transaction for control function 442 and transmitted back to the terminal at which the customer initiated the transaction by the process transaction for completion function 444. The return transaction to the ATM/POS terminal will include either a status of messages entered by the user or the messages (if any) that are retrieved from the E-Mail function of the store and forward message switch 52, and will also indicate the charges to the customer's account.

Correcting Billing Errors

Under certain circumstances the message service control function will not be able to complete providing the messages to the user at the ATM/POS terminal. Under these extraordinary circumstances, either a credit or a reversal of charges will be processed by the system. This will be identified as an error transaction and handled by the errors function 552. Errors function 552 provides, exactly as all other normal financial errors are handled. After proper validation of the circumstances, the process account debit function 554 will update the appropriate records to reverse the error, and the necessary transactions sent back to the message service control function through the insert message into output function 448.

HOW MESSAGES TO/FROM THE USER ARE SENT/RECEIVED

Access To The System

The link created by the customized store and forward message switch allows easy physical connection to all of the existing E-Mail services, and results in the ability to easily send messages to users of the new service from outside the ATM/POS systems.

Most message creators would be businessmen, secretaries, or spouses with access to some type of computer, allowing the creation of messages with considerable flexibility, and inserting them into the network as easily as using an E-Mail network.

A message terminal entry station 72 connected to either the customized store and forward message switch 52 or to any of the linked existing E-Mail systems would be able to send mail by knowing the customers' message service mailbox code. The only restriction will be that the length of the message text which can be processed by an ATM/POS terminal will be constrained.

Service Bureaus

Someone who needs to send a message to a user, who either is not themselves a user, or does not currently have access to a terminal, can call a message in to an operator in a service bureau who enters the message and arranges billing based on what has been authorized by the receiving subscriber. The service bureaus will be able to take messages from outside individuals, usually by phone 84, and insert them into the network on their behalf.

The customer can also send messages to individuals without a "mailbox" on the system by use of the service bureaus. Anyone with a phone or mailing address could be reached by sending a message for forwarding to the individual that the customer wanted to reach. Alternatively, the messaging system of the present invention can provide a communicated radio signal activating a pager being carried by the user to inform the user that a message has been deposited into his mailbox. The messaging system would, via modem using wired or wireless communications methods, dial the user's pager and enter a code indicating a message was waiting for the user.

Alternately, a user may set conditions or parameters in the system 10 such as date, time or other parameters related to the data in a message that will activate the system of the present invention to signal the intended receiver of the message through any of the alert functions such as a pager, fax or the like. Similar conditions or parameters may be used to generate or request message or data on behalf of the user.

Fax Output

A fax could also be sent from the system directly to a fax machine 82 without manual intervention.

Additional Information Sources

Message system 10 may additionally connect to a computerized, database system, through a configured computer terminal port 72 and into message switch 52, for deposit into a users mail location. Using this connection 72, the system allows access to digital data such as weather, news, brokerage, stock, commodities and general information and other data that would be beneficial to the user to store on or retrieve from the system. This information may be directed to the users mailbox based on a message request or parameters using the connection 72. This information may then be later retrieved by the user using subsystem 14.

INDUSTRIAL APPLICABILITY

Other alternatives for the electronic mail system 10 include, but are not limited to, varying the number of separate ATM/POS systems 12 capable of accessing the store and forward message switch 52.

Though each major component of the electronic mail system 10 is illustrated in the present embodiment as being in communication with a separate processor to perform the necessary system functions, normal computer capabilities allow a single processor to provide all, or any subset, of the functions described above for the electronic mail system 10. For example, the ATM institution processor 18 alone could provide the functions described for it together with the functions for the clearing house network processor 44, for the user's financial institution processor 46, and for the store and forward message switch 52 including interaction with multiple external E-Mail networks. In such a unified electronic mail system 10, the relationships among the various functions remain the same. However, such a unified electronic mail system 10 omits the data communication networks 42, 62 and 64. Other arrangements of processors 18, 36, 44 and 46 are possible depending on the relationship of institutions involved in providing the electronic mail service and their desire to participate in providing part of the network's overall capability.

To provide the functions of the electronic mail system 10, an institution having an processor 18 or 36 might place terminals 22, 24, 26, 28 or 34 of the type described in various public or private and private facilities such as airport or bus terminals, malls, financial institutions, retail merchants, hotels or such similar public or private and private locations, in order to effectively serve the needs of the general public or private.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. An electronic mail system that is accessible by a user thereof, said electronic mail system comprising:

a. An Automated Teller Machine or Point of Sale ("ATM/POS") system that includes a plurality of terminals through which the user may request access to said electronic mail system and at which the user may receive a message that has been stored or generate a message for storage in said electronic mail system, said ATM/POS system also including an ATM/POS institution processor which is remote from the plurality of terminals that intercommunicates with the plurality of terminals through an ATM/POS data communication network that is also included in said ATM/POS system; and b. a store and forward message switch which is remote from the plurality of terminals for storing the message and for transmitting the stored message to one of the plurality of terminals of said ATM/POS system upon receiving authorization to do so.

2. The electronic mail system of claim 1 wherein said store and forward message switch also records charges for the user's usage of said electronic mail system.

3. The electronic mail system of claim 1 wherein said store and forward message switch also receives a message from one of the plurality of terminals of said ATM/POS system and stores the received message upon being authorized to do so.

4. The electronic mail system of claim 3 wherein said store and forward message switch also records charges for the user's usage of said electronic mail system.

5. The electronic mail system of claim 3 wherein said store and forward message switch also receives a message for storage from or transmits the received message to a station that communicates with said store and forward message switch over a, message entry data communication network.

6. The electronic mail system of claim 5 wherein said store and forward message switch also transmits the received message to a pager communication service through a modem that communicates with said store and forward message switch over the message entry data communication network through at least one of a hard wired and wireless connection.

7. The electronic mail system of claim 5 wherein said store and forward message switch also transmits the received message to a facsimile transmission machine through a modem that communicates with said Store and forward message switch over the message entry data communication network through at least one of a hard wired and wireless connection.

8. The electronic mail system of claim 3 wherein said store and forward message switch also transmits the received message to a pager communication service through at least one of a hard wired and wireless modem that communicates with said store and forward message switch over a message entry data communication network.

9. The electronic mail system of claim 3 wherein said store and forward message switch also transmits the received message to a facsimile transmission machine through at least one of a hard wired and wireless modem that communicates with said store and forward message switch over a message entry data communication network.

10. The electronic mail system of claim 3 wherein authorization for said store and forward message switch to transmit the stored message to or to receive the received message from one of the plurality of terminals of said ATM/POS system requires that a debit or credit card be inserted in said one terminal after which a personal identification number must be entered into said one terminal.

11. The electronic mail system of claim 3 wherein a menu is provided at one of the plurality of terminals of said ATM/POS system that permits selection either of message transmission from said store and forward message switch to said one terminal, or of message reception by said store and forward message switch from said one terminal.

12. The electronic mail system of claim 11 wherein the menu provided at said one terminal of said ATM/POS system permits selection of the message for transmission from said store and forward message switch to said one terminal from among several messages stored for the user on said store and forward message switch.

13. The electronic mail system of claim 11 wherein authorization for said store and forward message switch to transmit the stored message to or to receive the received message from one of the plurality of terminals of said ATM/POS system requires that a debit or credit card be inserted into said one terminal after which a personal identification number must be entered into said one terminal.

14. The electronic mail system of claim 13 wherein the debit or credit card inserted into one of the plurality of terminals includes a memory and/or a computer, and stored within the card is a special menu that can be read into said one terminal for display thereon.

15. The electronic mail system of claim 13 wherein the debit or credit card inserted into one of the plurality of terminals includes a memory and/or a computer, and stored within the card is a special message that can be read into said one terminal for display thereon.

16. The electronic mail system of claim 13 wherein the debit or credit card inserted into one of the plurality of terminals includes a memory and/or a computer, and stored within the card is a directory of individuals to whom the user sends messages.

17. The electronic mail system of claim 13 wherein the debit or credit card inserted into one of the plurality of terminals includes a memory and/or a computer, and the message transmitted from said store and forward message switch to said one terminal is stored within the card.

18. The electronic mail system of claim 11 wherein one of the plurality of terminals includes a pen pad upon which the user may write the message prior to the message's transmission to the store and forward message switch.

19. The electronic mail system of claim 11 wherein one of the plurality terminals includes an optical character recognition subsystem for at least one of scanning the message that is received by the store and forward message switch and scanning a financial instrument used for a coded message or financial transaction.

20. The electronic mail system of claim 11 further comprising a user's financial institution processor distinct from the ATM/POS institution processor, said user's financial institution processor receiving requests from said ATM/POS system that the user be allowed to access said electronic mail system and authorizing such access by properly qualified users, said store and forward message switch transmitting the stored message to one of the plurality of terminals of said ATM/POS system upon receiving authorization from said user's financial institution processor.

21. The electronic mail system of claim 20 wherein said user's financial institution processor also records charges for the user's usage of said electronic mail system.

22. The electronic mail system of claim 20 further comprising a clearing house data communication network that interconnects said ATM/POS system and said user's financial institution with a clearing house network processor, the clearing house network processor accepting the user's request to access said electronic mail system from said ATM/POS system and transmitting such request to said user's financial institution.

23. The electronic mail system of claim 22 wherein said clearing house network processor also performs a message service control function that tracks the status of and steps required to retrieve the stored message from said store and forward message switch.

24. A method for exchanging electronic mail messages with a plurality of accessible terminals included in an ATM/POS system that also includes an ATM/POS institution processor remote from the plurality of terminals, the method comprising the steps of:

a. storing a message for a user on a store and forward message switch remote from the plurality of terminals;

b. authorizing transmission of the stored message from the store and forward message switch to one of the plurality of terminals of the ATM/POS system in response to the user's entry of a request therefore into said one terminal of the ATM/POS system.

25. The method of claim 24 further comprising the step of recording charges for a user's exchanging of electronic mail messages.

26. The method of claim 24 further comprising the step of receiving a message from the user at one of the plurality of terminals of the ATM/POS system and storing the received message on the store and forward message switch upon receiving authorization to do so.

27. The method of claim 26 further comprising the step of recording charges for a user's exchanging of electronic mail messages.

28. The method of claim 26 further comprising the step of receiving a message for storage on the store and forward message switch from a station that communicates with the store and forward message switch over a message entry data communication network.

29. The method of claim 26 further comprising the step of transmitting a message from the store and forward message switch to a station that communicates with the store and forward message switch over a message entry data communication network.

30. The method of claim 28 further comprising the step of transmitting a message from the store and forward message switch to a pager communication service through at least one of a hard wired and wireless modem that communicates with the store and forward message switch over a message entry data communication network.

31. The method of claim 28 further comprising the step of transmitting a message from the store and forward message switch to a facsimile transmission machine through at least one of a hard wired and wireless modem that communicates with the store and forward message switch over a message entry data communication network.

32. The method of claim 26 further comprising the step of transmitting a message from the store and forward message switch to a pager communication service through at least one of a hard wired and wireless modem that communicates with the store and forward message switch over a message entry data communication network.

33. The method of claim 26 further comprising the step of transmitting a message from the store and forward message switch to a facsimile transmission machine through at least one of a hard wired and wireless modem that communicates with the store and forward message switch over a message entry data communication network.

34. The method of claim 26 wherein authorization for the user to exchange electronic mail messages further comprises the steps of:

c. inserting a debit or credit card into said one terminal of the ATM/POS system; and
  d. entering a personal identification number into said one terminal.

35. The method of claim 26 further comprising the step of providing a menu at one of the plurality of terminals of the ATM/POS system from which the user may select either message transmission from the store and forward message switch to said one terminal, or of message reception by the store and forward message switch from said one terminal.

36. The method of claim 35 further comprising the step of providing a menu at one of the plurality of terminals of the ATM/POS system that permits the user to select the message for transmission from said store and forward message switch to said one terminal from among several messages stored for the user on said store and forward message switch.

37. The method of claim 35 wherein authorization for the user to exchange electronic mail messages further comprises the steps of:

c. inserting a debit or credit card into said one terminal of the ATM/POS system; and
  d. entering a personal identification number into said one terminal.

38. The method of claim 37 further comprising the step of displaying upon one of the plurality of terminals of the ATM/POS system a special menu read into said one terminal from a memory and/or a computer included in the debit or credit card inserted into said one terminal.

39. The method of claim 37 further comprising the step of displaying upon the terminal of the ATM/POS system a special message read into said one terminal.

40. The method of claim 37 further comprising the step of displaying upon said one terminal of the ATM/POS system a directory of individuals to whom the user sends messages that is read into the terminal from a memory and/or a computer included in the debit or credit card inserted into said one terminal.

41. The method of claim 37 wherein the debit or credit card inserted into said one terminal includes a memory and/or a computer, the method further comprising the step of storing the message transmitted from the store and forward message switch into the debit or credit card.

42. The method of claim 35 wherein the user enters the message received by the store and forward message from the user at one of the plurality of terminals of the ATM/POS system by writing the message upon a pen pad prior to the message's transmission to the store and forward message switch.

43. The method of claim 35 wherein the user enters the message received by the store and forward message switch from the user at one of the plurality of terminals of the ATM/POS system by optically scanning the message prior to the message's transmission to the store and forward message switch.

44. The method of claim 35 further comprising the step of obtaining authorization for the user to exchange electronic mail messages with the store and forward message switch from a user's financial institution processor that is distinct from the ATM/POS institution processor.

45. The method of claim 44 further comprising the step of the user's financial institution processor recording at least one of charges for a user's exchanging of electronic mail messages and charges for associated billing of a related transaction enabled by the message service.

46. The method of claim 44 further comprising the step of transmitting communications between the ATM/POS system and the user's financial institution processor through a clearing house data communication network and a clearing house network processor.

47. The method of claim 46 further comprising the step of the clearing house network processor performing the status of and steps required to retrieve the stored message from the store and forward message switch.

48. The electronic mail system of claim 1 wherein one of the plurality of terminals includes an optical character recognition subsystem for scanning the message that is received by the store and forward message switch.

49. The electronic mail system of claim 1 wherein one of the plurality of terminals includes a magnetic ink character recognition subsystem for scanning the message that is received by the store and forward message switch.

50. The electronic mail system of claim 1 wherein one of the plurality of terminals includes a bar code recognition subsystem for scanning the message that is received by the store and forward message switch.

51. The electronic mail system of claim 3 wherein the message is at least one of expanded, translated, encrypted and decrypted during processing.

52. The electronic mail system of claim 3 wherein said store and forward message switch also receives a message from a computerized database system and stores the received message upon being authorized to do so.

53. The electronic mail system of claim 3 wherein said store and forward message switch also receives a message from a computerized digital database system through one of the plurality of terminals and stores the received message upon being authorized to do so.

54. The electronic mail system of claim 52 wherein said computerized database system includes at least one of a database providing news message information, a database providing stock message information, a database providing commodities message information, and a database providing brokerage message information.

55. The electronic mail system of claim 3 including a translation processor for translating the message during processing.

56. The electronic mail system of claim 3 including an expansion processor for expanding the message during processing.

57. The electronic mail system of claim 3 including an encryption processor for encrypting the message during processing.

58. The electronic mail system of claim 3 including a decryption processor for decrypting the message during processing.

59. The electronic mail system of claim 55 wherein said translation processor translates the message from one language to another during processing.

60. The electronic mail system of claim 1 wherein said store and forward message switch receives a message which includes instructions for at least one of paying a bill of the user's and completing a financial transaction.

61. The electronic mail system of claim 1 including an error checking processor which checks the content of said message and compares said message to predetermined parameters to check for errors in said message.

62. The electronic mail system of claim 61 wherein said error checking processor receives a set of predetermined parameters and logically compares said parameters to said message to determine if said message meets said predetermined parameters and should be sent.

63. The electronic mail system of claim 1 including a message generator which generates said message and initiates the transmission of said message at a user determined time.

64. The method of claim 24 further comprising the step of scanning said message that is received by said store and forward message switch into said terminal.

65. The method of claim 64 wherein the step of scanning said message includes scanning said message by an optical character recognition system.

66. The method of claim 64 wherein the step of scanning said message includes scanning said message by a magnetic ink character recognition system.

67. The method of claim 64 wherein the step of scanning said message includes scanning said message by a bar code recognition system.

68. The method of claim 26 including the step of at least one of expanding, translating, encrypting or decrypting said message during processing.

69. The method of claim 26 including the step of receiving a message from a computerized database system and storing said received message on said store and forward message upon being authorized to do so.

70. The method of claim 26 including the step of receiving a message from a computerized digital database system through one of the plurality of terminals and storing said received message on said store and forward message switch upon being authorized to do so.

71. The method of claim 69 wherein said step of receiving a message from a computerized database system includes receiving said message from a digital database providing at least one of weather message information, news message information, stock message information, commodities message information, brokerage message information and general information on various topics.

72. The method of claim 26 including the step of translating said message during processing.

73. The method of claim 72 wherein the step of translating said message includes translating said message from one language to another language during processing.

74. The method of claim 26 including the step of expanding said message during processing.

75. The method of claim 26 including the step of encrypting said message during processing.

76. The method of claim 26 including the step of decrypting said message during processing.

77. The method of claim 24 wherein the step of storing a message includes storing a message on said store and forward message switch which includes instructions for at least one of paying a bill of the user's and completing a financial transaction.

78. The method of claim 24 including the step of checking the content of said message and comparing said message to predetermined parameters to check said message for errors.

79. The method of claim 78 wherein the step of checking the content of said message includes comparing said message to a set of predetermined parameters to determine if said message meets said predetermined parameters and should be processed further.

80. The method of claim 24 including the step of generating a message and initiating the transmission of said message at a predetermined time.

* * * * *

UNITED STATES PATENT AND TRADEMARK OFFICE
CERTIFICATE OF CORRECTION

PATENT NO. : 5,473,143

DATED : December 5, 1995

INVENTOR(S) : Hugo Vajk, William Stephens, Fred Zimmerman

It is certified that error appears in the above-identified patent and that said Letters Patent are hereby corrected as shown below: On the title page:

Item 75 "Vak" should read -- "Vajk"--

Column 42, Line 21, delete "digital"
Column 42, Line 24, insert --"and"-- before "brokerage"
Column 42, Line 24 and 25, delete "and general information on various topics"

Signed and Sealed this

Twenty-fifth Day of March, 1997

Attest:

BRUCE LEHMAN

*Attesting Officer*  Commissioner of Patents and Trademarks